US010024665B2

(12) United States Patent
Bailey et al.

(10) Patent No.: US 10,024,665 B2
(45) Date of Patent: Jul. 17, 2018

(54) ENVIRONMENTAL WAYPOINT INSERTION

(71) Applicant: The Boeing Company, Chicago, IL (US)

(72) Inventors: Louis J. Bailey, Kent, WA (US); Ryan D. Hale, Kent, WA (US)

(73) Assignee: The Boeing Company, Chicago, IL (US)

( * ) Notice: Subject to any disclaimer, the term of this patent is extended or adjusted under 35 U.S.C. 154(b) by 513 days.

(21) Appl. No.: 14/617,156

(22) Filed: Feb. 9, 2015

(65) Prior Publication Data

US 2015/0153177 A1 Jun. 4, 2015

Related U.S. Application Data

(62) Division of application No. 14/252,906, filed on Apr. 15, 2014, now Pat. No. 8,954,264, and a division of application No. 12/860,111, filed on Aug. 20, 2010, now Pat. No. 8,744,747.

(51) Int. Cl.
*G06F 19/00* (2018.01)
*G01C 21/00* (2006.01)
*G01C 21/20* (2006.01)
*G08G 5/00* (2006.01)

(52) U.S. Cl.
CPC ............. *G01C 21/00* (2013.01); *G01C 21/20* (2013.01); *G08G 5/0013* (2013.01); *G08G 5/0034* (2013.01); *G08G 5/0039* (2013.01); *G08G 5/0052* (2013.01); *G08G 5/0091* (2013.01)

(58) Field of Classification Search
CPC .. G08G 5/0039; G08G 5/0013; G08G 5/0034; G08G 1/20; G08G 5/00; G08G 5/0021
See application file for complete search history.

(56) References Cited

U.S. PATENT DOCUMENTS

| 4,642,775 | A | * | 2/1987 | Cline | G01C 21/00 701/528 |
|---|---|---|---|---|---|
| 5,615,118 | A | * | 3/1997 | Frank | G01C 21/16 342/26 B |
| 6,199,015 | B1 | * | 3/2001 | Curtwright | G01C 21/20 340/990 |
| 6,542,796 | B1 | * | 4/2003 | Gibbs | G01C 23/005 244/183 |

(Continued)

FOREIGN PATENT DOCUMENTS

WO WO2001022034 A2 * 3/2001 ............. B64D 45/00

OTHER PUBLICATIONS

Office Action, dated Oct. 15, 2012, regarding U.S. Appl. No. 12/860,111, 9 pages.

(Continued)

*Primary Examiner* — Redhwan K Mawari
(74) *Attorney, Agent, or Firm* — Yee & Associates, P.C.

(57) ABSTRACT

The different advantageous embodiments provide a system and method for suggesting significant environmental waypoints along a trajectory to improve the efficiency of a flight plan. Desired information is identified, wherein the desired information is information needed to perform at least one of completing a flight plan and updating a flight plan. It is determined whether to identify environmental information points.

16 Claims, 17 Drawing Sheets

(56) References Cited

U.S. PATENT DOCUMENTS

| | | | |
|---|---|---|---|
| 7,069,121 B1* | 6/2006 | Cummings, Jr. | G01C 23/00 340/8.1 |
| 8,165,790 B2 | 4/2012 | Bailey | |
| 8,332,084 B1 | 12/2012 | Bailey et al. | |
| 8,416,099 B2 | 4/2013 | Bailey et al. | |
| 8,744,747 B1 | 6/2014 | Bailey et al. | |
| 8,954,264 B2 | 2/2015 | Bailey et al. | |
| 2007/0078572 A1* | 4/2007 | Deker | G08G 5/0013 701/3 |
| 2007/0150178 A1* | 6/2007 | Fortier | G08G 5/0034 701/467 |
| 2008/0300737 A1* | 12/2008 | Sacle | G01C 21/00 701/3 |
| 2009/0012663 A1* | 1/2009 | Mead | G01W 1/10 701/14 |
| 2010/0103029 A1* | 4/2010 | Khatwa | G01S 7/22 342/26 B |
| 2014/0229097 A1 | 8/2014 | Bailey et al. | |

OTHER PUBLICATIONS

Final Office Action, dated Jun. 14, 2013, regarding U.S. Appl. No. 12/860,111, 9 pages.

Notice of Allowance, dated Jan. 24, 2014, regarding U.S. Appl. No. 12/860,111, 9 pages.

Notice of Allowance, dated Oct. 2, 2014, regarding U.S. Appl. No. 14/252,906, 16 pages.

* cited by examiner

ENVIRONMENTAL WAYPOINT INSERTION

This application is a divisional of U.S. patent application Ser. No. 14/252,906, filed Apr. 15, 2014, now U.S. Pat. No. 8,954,264, which is a divisional of U.S. patent application Ser. No. 12/860,111, filed Aug. 20, 2010, now U.S. Pat. No. 8,744,747, the disclosures of which are incorporated by reference herein in their entirety.

BACKGROUND INFORMATION

1. Field

The present disclosure relates generally to aircraft and in particular to a method and apparatus for providing environmental information to a subscriber. Still more particularly, the present disclosure relates to a method and apparatus for dynamically suggesting environmental waypoints for insertion into a flight plan or trajectory.

2. Background

Environmental information is used both during the planning and execution of flight operations. Planning flight operations results in the creation of flight plans. Flight plans are used to document basic information such as departure and arrival points, estimated time en route, various waypoints the aircraft must traverse en route, information pertaining to those waypoints, such as altitude and speed, and information relating to legs of the flight between those waypoints. This type of flight plan may be used to construct a flight trajectory including the various legs of the flight, which are connected to the various waypoints along the route.

Environmental information for the route between the departure and arrival points, including information about forecasted weather for the various waypoints along the route, may affect a flight trajectory. For example, if incorrect weather is forecasted for a particular waypoint along the route of the flight plan, certain predictions for the flight trajectory may become inaccurate, such as speed, fuel consumption, and time en route.

In current systems, the transmission of environmental information to an aircraft, for example, may be done at regulated intervals or upon a manual request, if done at all. The timing of the transmission is independent of any consideration of the pertinence of the information or the economic benefit of sending the transmission at that time. As a result, the environmental information may be inaccurate or dated at the time of transmission, which can result in inefficiencies for flight operations, such as an increase in fuel consumption and emissions or delay in flight time, for example.

Flight plan waypoints are typically updated to signify a change in speed, course, or altitude, but not to signify weather. As a result, inefficiencies in predicted ground speeds may be introduced, which impact estimated times of arrival.

Therefore, it would be advantageous to have a method and apparatus that overcomes one or more of the issues described above as well as possibly other issues.

SUMMARY

The different advantageous embodiments provide a system comprising an environmental waypoint insertion process and a processor unit. The processor unit is configured to run the environmental waypoint insertion process. The environmental waypoint insertion process is configured to receive information. The environmental waypoint insertion process determines whether to suggest additional waypoints for insertion into a flight plan to a subscriber.

The different advantageous embodiments further provide a method for insertion of environmental waypoints. Information having at least one of a number of environmental information points and a trajectory of a flight plan is identified using a processor unit. At least one of each of the number of environmental information points identified and the trajectory of the flight plan is analyzed. A determination is made as to whether a current environmental information point is considered significant based on given parameters using an assessment processor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
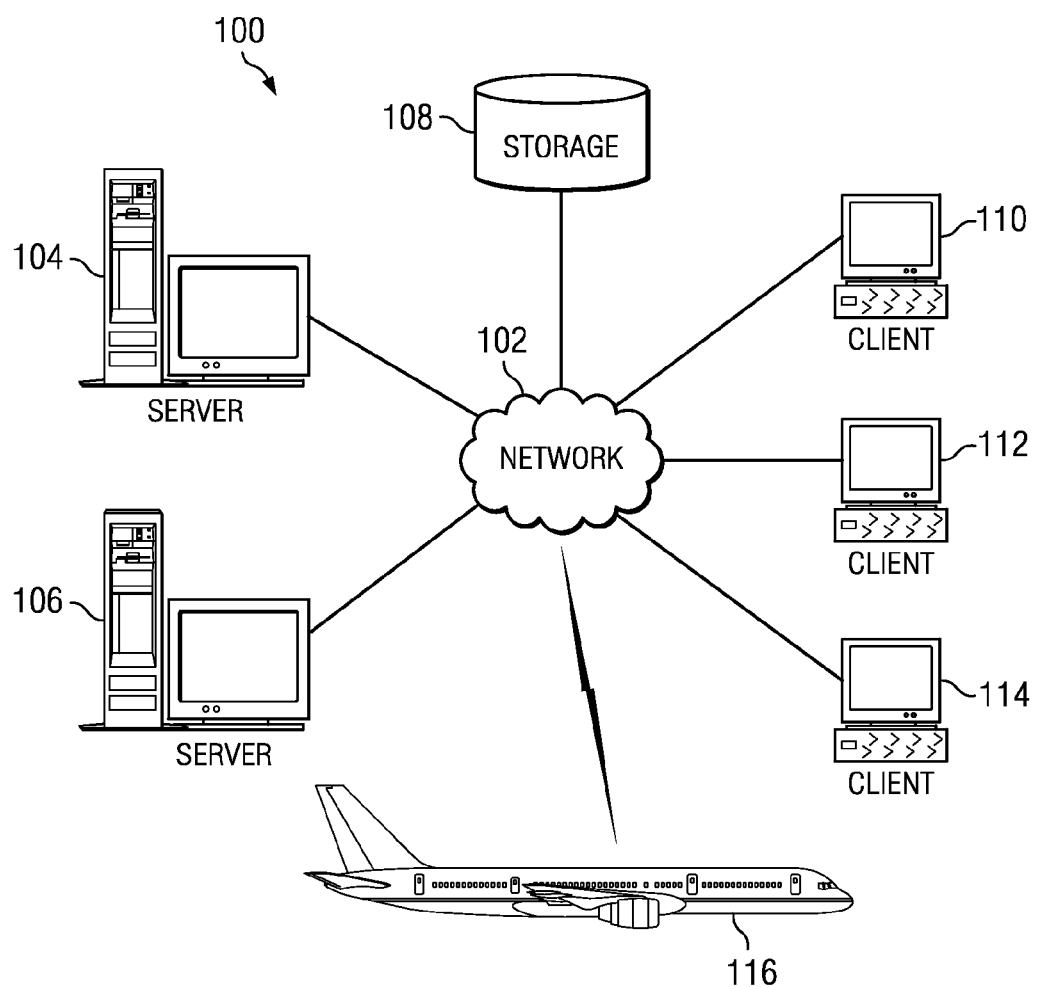
FIG. 1 is a pictorial representation of a network of data processing systems in which the advantageous embodiments of the present invention may be implemented.
Figure 2:
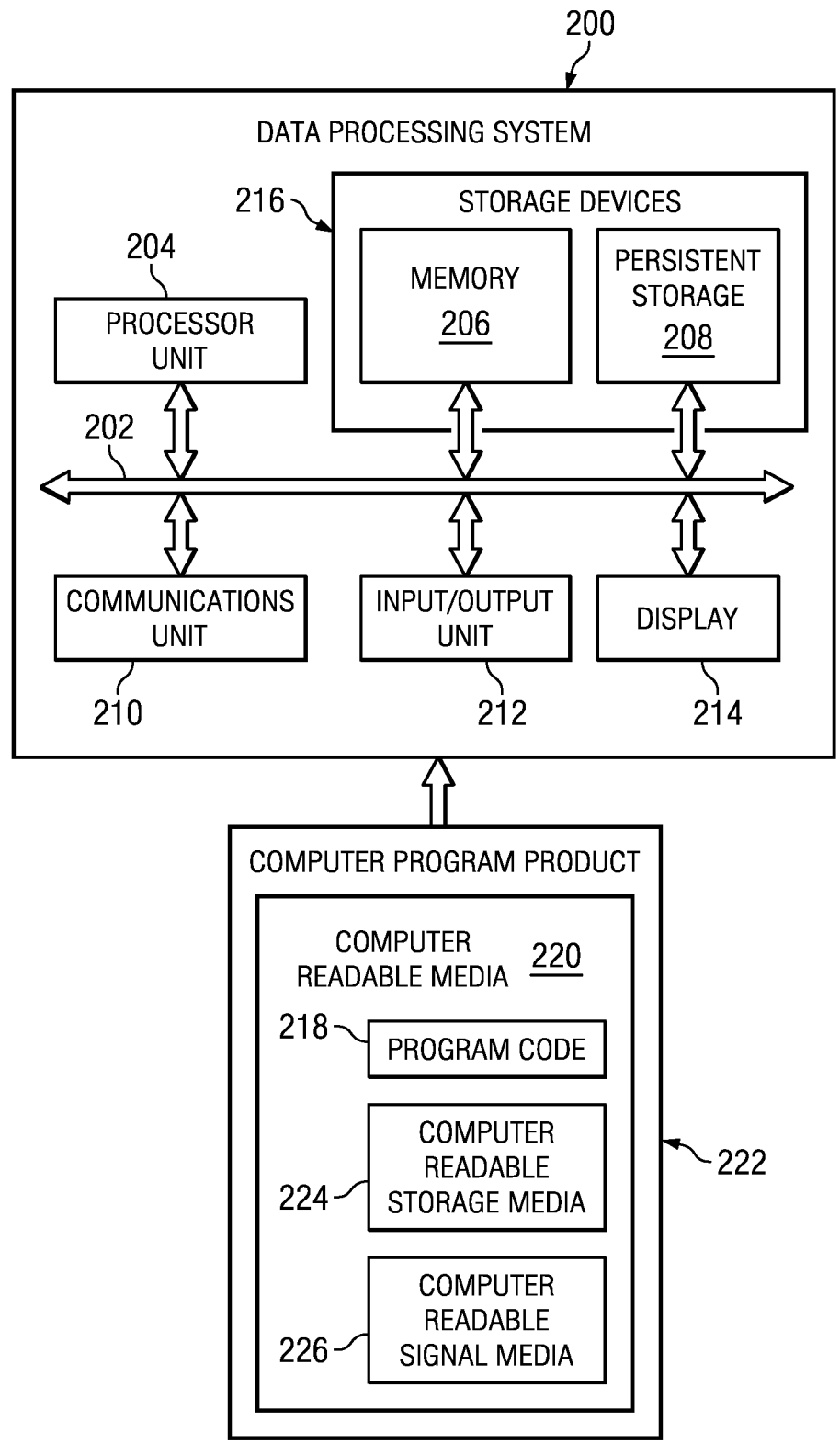
FIG. 2 is an illustration of a data processing system in accordance with an advantageous embodiment.

With reference now to the figures and in particular with reference to FIGS. 1-2, illustrative diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a block diagram of a data processing system is depicted in accordance with an advantageous embodiment. Data processing system 200 is an example of a data processing system that may be used to implement servers and clients, such as server 104 and client 110 in FIG. 1. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account a number of different considerations. For example, the different advantageous embodiments recognize and take into account that currently used systems do not have the ability to suggest flight plan waypoint insertions based on environmental points. Even when environmental information is transmitted, current methods increase inefficiencies in the flight trajectory calculations if the environmental information is out of date, not entered into a flight management computer, or provided at the wrong time. Additionally, current systems and methods for transmitting environmental information do not consider the impact of environmental factors, flight phases, the type of environmental information, or aircraft events on the required procedures from air traffic management. Required procedures may include speed constraints, route adjustments, or other flight modifications in response to a significant environmental cell. The unpredictability of existing solutions can lead to poor scheduling solutions and less efficient flights.

The different advantageous embodiments further recognize and take into account the need for a system that can identify environmental cells affecting a flight trajectory and automatically suggest waypoint insertions to maintain accuracy of time predictability, fuel consumption, and aircraft performance.

Thus, the different advantageous embodiments provide a system comprising an environmental waypoint insertion process and a processor unit. The processor unit is configured to run the environmental waypoint insertion process. The environmental waypoint insertion process is configured to receive information. The environmental waypoint insertion process determines whether to suggest additional waypoints for insertion into a flight plan to a subscriber.

The different advantageous embodiments further provide a method for insertion of environmental waypoints. Information having at least one of a number of environmental points and a trajectory of a flight plan is identified using a processor unit. At least one of each of the number of environmental information points identified and the trajectory of the flight plan is analyzed. A determination is made as to whether a current environmental information point is considered significant based on given parameters using an assessment processor.

Figure 3:
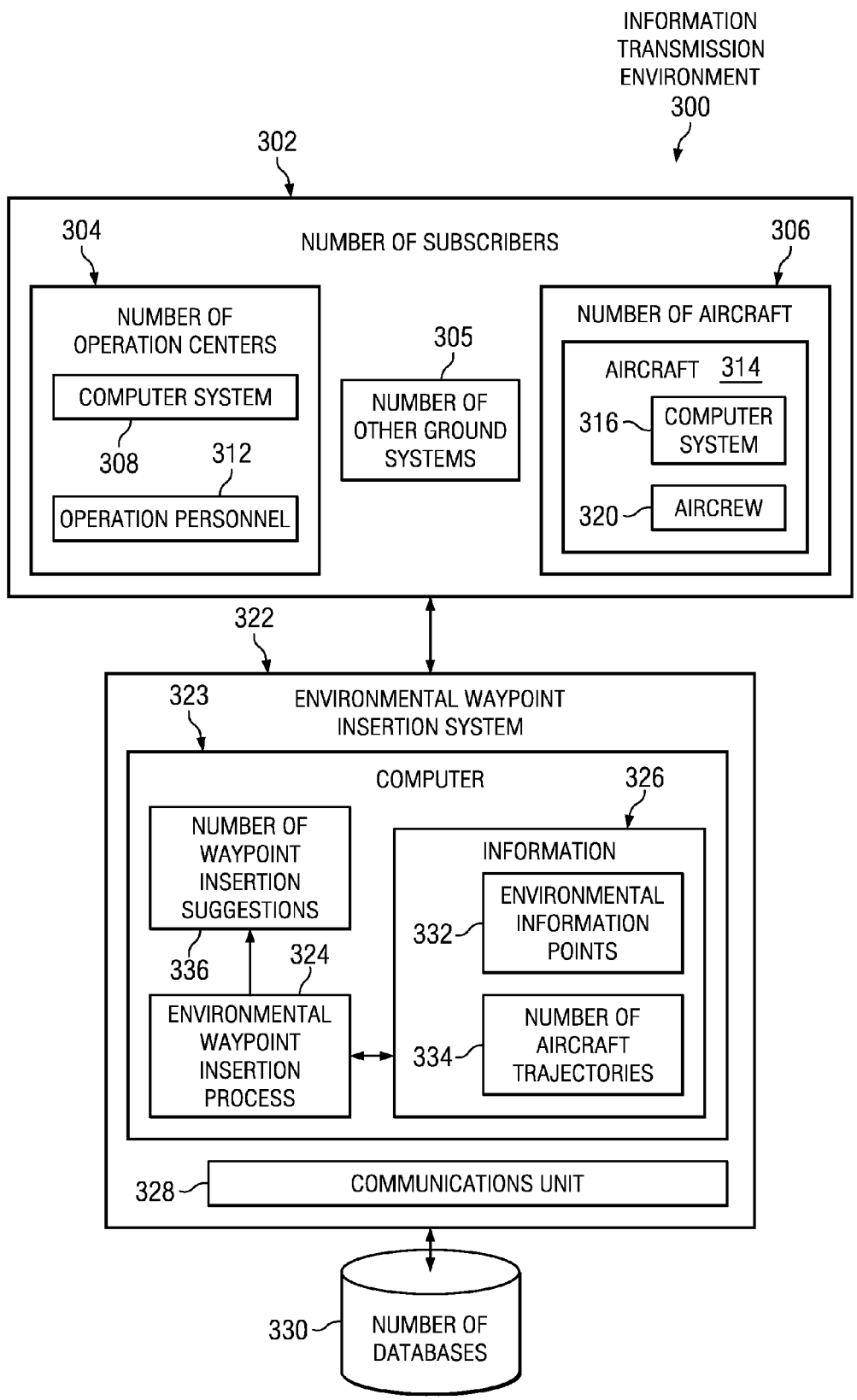
FIG. 3 is an illustration of an information transmission environment in accordance with an advantageous embodiment.

With reference now to FIG. 3, an illustration of an information transmission environment is depicted in accordance with an advantageous embodiment. Information transmission environment 300 may be an illustrative example of one implementation of a networked transmission environment, such as network 102 in FIG. 1.

Information transmission environment 300 includes number of subscribers 302. Number of subscribers 302 may include, for example, without limitation, number of operation centers 304, number of other ground systems 305, number of aircraft 306, and/or any other suitable subscriber. Number of operation centers 304 may include, without limitation, airline operation centers at various locations, and/or any other type of operation centers, for example.

Number of operation centers 304 includes computer system 308 and operation personnel 312. Computer system 308 may include a number of computers. As used herein, a number refers to one or more computers. The number of computers of computer system 308 may be networked in an environment such as network 102 in FIG. 1. Number of operation centers 304 may also include operation personnel 312.

Number of aircraft 306 may be any type of aircraft including, without limitation, jet engine aircraft, twin engine aircraft, single engine aircraft, rotorcraft, spacecraft, and/or any other suitable type of aircraft. Aircraft 314 may be an example of one implementation of number of aircraft 306. Aircraft 314 includes computer system 316 and aircrew 320. Computer system 316 may include a number of computers. The number of computers of computer system 316 may be networked in an environment such as network 102 in FIG. 1. The number of computers may be implemented using data processing system 200 in FIG. 2, in an illustrative example. Number of other ground systems 305 may include, without limitation, weather reporting stations, weather monitoring stations, and/or any other suitable ground system.

In one advantageous embodiment, environmental waypoint insertion system 322 is located in a remote location from number of operation centers 304, number of other ground systems 305, and number of aircraft 306. In this example, environmental waypoint insertion system 322 may be operated by a third party service. In another advantageous embodiment, environmental waypoint insertion system 322 is located within number of operation centers 304 and/or number of aircraft 306. Environmental waypoint insertion system 322 includes computer 323 and communications unit 328. Environmental waypoint insertion system 322 uses communications unit 328 to interact with number of subscribers 302, such as number of operation centers 304, number of other ground systems 305, and number of aircraft 306. Environmental waypoint insertion system 322 may be implemented using one or more of data processing system 200 in FIG. 2, for example.

Communications unit 328, in these examples, provides for communications with other data processing systems or devices. In these examples, communications unit 328 may be a network interface card. Communications unit 328 may provide communications through the use of either or both physical and wireless communications links. Communications unit 328 may be integrated with computer 323 and/or may be independent from and accessible to computer 323.

Computer 323 may include environmental waypoint insertion process 324 and information 326. Environmental waypoint insertion process 324 is configured to access number of databases 330. Number of databases 330 may include various databases with information such as, environmental information from a ground provider, aircraft reported environmental information, aircraft state data, aircraft predictions, aircraft model identification, flight plans, flight trajectories, customer configurations, and/or any other suitable information. Environmental waypoint insertion system 322 may receive information 326 from a number of different sources. In one advantageous embodiment, information 326 may be accessed using number of databases 330. In another advantageous embodiment, information 326 may be received from number of operation centers 304, number of other ground systems 305, and/or number of aircraft 306.

Environmental waypoint insertion process 324 is configured to receive information 326 from a number of different sources and determine a number of suggested waypoint insertions for a flight plan to transmit to number of subscribers 302. A waypoint is a reference point in physical space used for navigation.

Environmental waypoint insertion process 324 may analyze a number of factors in order to determine whether suggested waypoint insertions or updated flight plans should be sent to a subscriber in number of subscribers 302. In an illustrative example, one factor that may be considered by environmental waypoint insertion process 324 may be whether a current flight plan includes parameters matching those set by customer configuration requiring waypoint insertion.

Information 326 includes environmental information points 332 and number of aircraft trajectories 334. Environmental information points 332 are a number of four dimensional points with associated environmental information. The four dimensional points include latitude, longitude, altitude, and time. The associated environmental information is specific to each of the four dimensions of the point. In other words, the environmental information associated with an environmental point is for a specific latitude, longitude, altitude, and time.

Number of aircraft trajectories 334 is a number of trajectories associated with flight plans for aircraft, such as number of aircraft 306. Each of the number of aircraft trajectories 334 may be associated with one or more environmental information points 332. In an illustrative example, operation personnel 312 of number of operation centers 304 may send updated flight trajectories in information 326 to environmental waypoint insertion process 324 of computer 323. In this example, environmental waypoint insertion process 324 may also receive environmental information points 332 in information 326 from number of other ground systems 305.

Environmental waypoint insertion process 324 processes information 326 against configurations from number of databases 330 to determine number of waypoint insertion suggestions 336. The configurations may be, for example, without limitation, customer configurations, default configurations, dynamic configurations, and/or any other suitable configurations. Number of waypoint insertion suggestions 336 may be transmitted back to number of operation centers 304 and/or number of aircraft 306 as an updated flight plan, in an illustrative example.

The illustration of information transmission environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, environmental waypoint insertion system 322 may be distributed across or located in at least one of a remote location, number of operation centers 304, number of other ground systems 305, and/or number of aircraft 306. In another advantageous embodiment, environmental waypoint insertion system 322 may be implemented with other processes in addition to environmental waypoint insertion process 324. In yet another advantageous embodiment, environmental waypoint insertion system 322 may be integrated with an environmental information detection system, for example.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Figure 4:
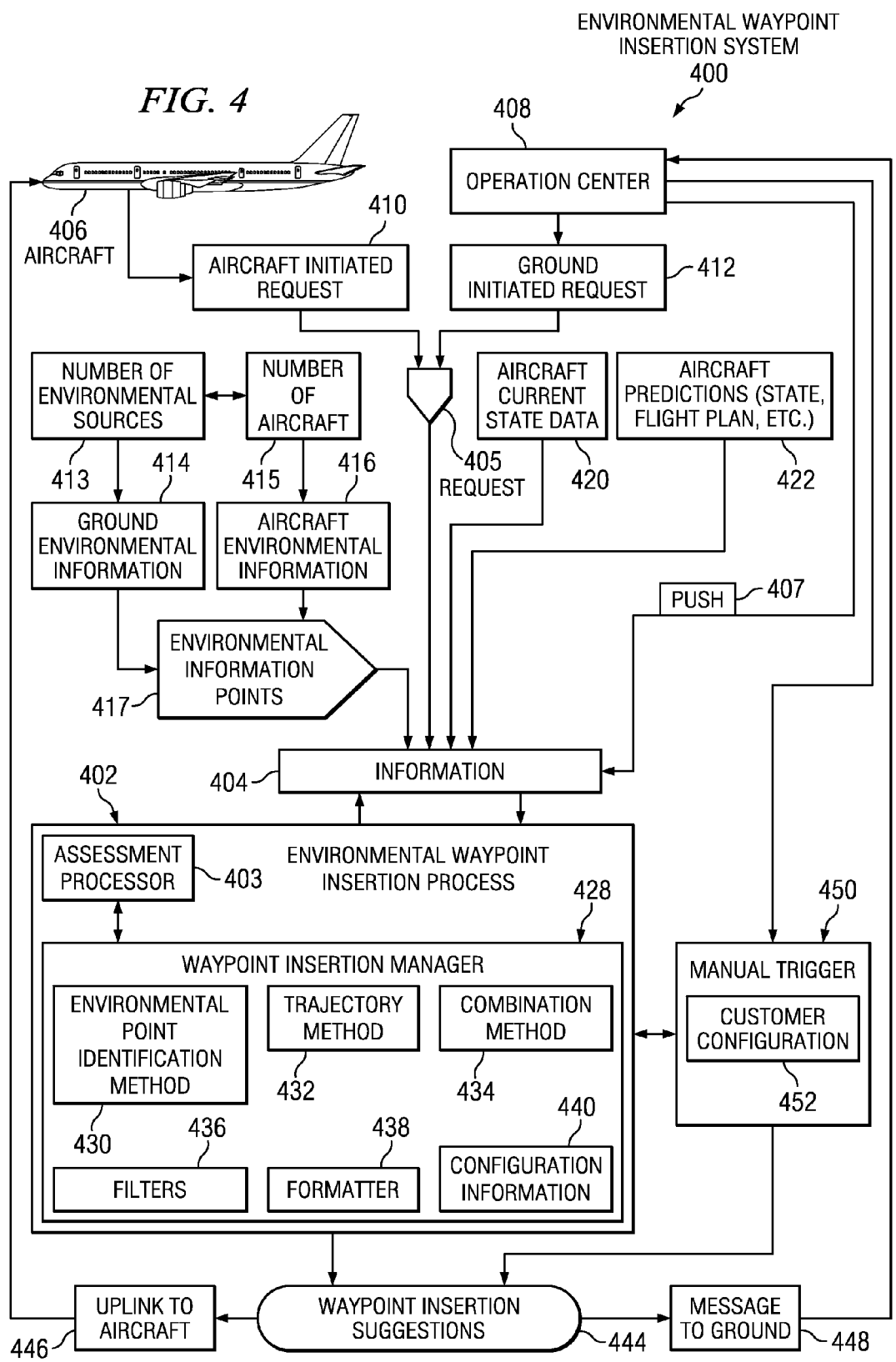
FIG. 4 is an illustration of an environmental waypoint insertion system in accordance with an advantageous embodiment.

Turning now to FIG. 4, an illustration of an environmental waypoint insertion system is depicted in accordance with an advantageous embodiment. Environmental waypoint insertion system 400 is an illustrative example of one implementation of environmental waypoint insertion system 322 in FIG. 3. Environmental waypoint insertion system 400 may be implemented using a data processing system, such as data processing system 200 in FIG. 2.

Environmental waypoint insertion system 400 includes environmental waypoint insertion process 402. Environmental waypoint insertion process 402 is configured to receive information 404 and use information 404 to determine when to suggest additional waypoint insertions into a flight plan or flight trajectory. Information 404 is an illustrative example of one implementation of information 326 in FIG. 3. Information 404 may be specific to a flight plan and/or a particular current and predicted flight trajectory, for example. The determination as to whether to suggest additional waypoints and which waypoints to suggest is made by environmental waypoint insertion process 402 based on waypoint insertion manager 428, assessment processor 403, and information 404. In an illustrative example, information 404 includes environmental information.

Environmental information may include, but is not limited to, weather, temperature, pressure, humidity, turbulence, icing, wind speed, wind direction, wind vertical acceleration, thermal anti-icing for engine bleeds, temperature deviations from standard atmospheric temperatures, emissions of air and/or noise pollutants, barometric pressure, and/or any other suitable environmental information. Different types of environmental information messages may be transmitted depending upon phase of flight and/or the state of a flight plan. Phase of flight may include, for example, without limitation, on-ground, climbing, cruising, descending, and/or any other suitable phase of flight. The state of a flight plan may include, for example, without limitation, active flight plan, inactive flight plan, alternate flight plan, and/or any other suitable state. Aircraft events may include, for example, without limitation, gear extension, gear retraction, flap extension, flap retraction, step climb points, step down points, and/or any other suitable aircraft event where there are changes in aircraft pitch, speed, and/or thrust.

Environmental waypoint insertion process 402 may continually evaluate information 404 received in order to dynamically determine whether and when to suggest additional waypoints for a flight plan to a subscriber, such as aircraft 406 and/or operation center 408, for example. Environmental waypoint insertion process 402 may also be triggered to evaluate information 404 by request 405, push 407, or some other event to dynamically determine whether and when to suggest additional waypoints for a flight plan to a number of subscribers. Request 405 may be initiated by either aircraft 406 through aircraft initiated request 410, operation center 408 through ground initiated request 412, or some other automatic event, such as push 407 from operation center 408, for example. In another illustrative example, request 405 may be made from one aircraft to another aircraft using network 102 in FIG. 1, for example.

Request 405 may include a specific flight plan or flight trajectory used by environmental waypoint insertion process 402 to dynamically determine significant environmental points, if any, corresponding to the specific flight trajectory received in request 405, for example. As additional illustrative examples, the event triggering request 405 may be, for example, without limitation, receipt of updated environmental information, a change in a flight plan, or some other suitable event. Push 407 may be an automatic information push of a flight plan and/or environmental information to environmental waypoint insertion process 402 to calculate significant environmental points associated with the flight plan before any request is made by an aircraft, for example. Significant environmental points are any environmental points along a trajectory that fall within given parameters as significant for at least one of the customer, airspace environment, flight, flight plan, flight time, fuel consumption, and/or any other suitable factor of a flight. These parameters may be set forth in configuration information 440, in an illustrative example.

Environmental waypoint insertion system 400 may use the requirements set forth in configuration information 440 as to what is considered significant to generate a solution for the system. As a total system, there may be a solution that dynamically weights each of these requirements. For example, the system may be the total operating airspace or the entire air traffic system. In this illustrative example, significance may be assigned for the total air traffic delay across a region, such as the United States, or into specific environments due to weather.

Environmental waypoint insertion process 402 may receive information 404 from a number of different sources, including, without limitation, a number of databases, such as ground environmental information 414, aircraft environmental information 416, aircraft current state data 420, and aircraft predictions 422. Ground environmental information 414, aircraft environmental information 416, aircraft current state data 420, and aircraft predictions 422 may be illustrative examples of one implementation of number of databases 330 in FIG. 3. In another advantageous embodiment, ground environmental information 414 may be an illustrative example of one implementation of number of other ground systems 305 in FIG. 3. Ground environmental information 414 may receive environmental information from number of environmental sources 413. Number of environmental sources 413 may be an illustrative example of a number of weather sources, for example. Environmental waypoint insertion process 402 may also receive information 404 directly from a number of aircraft and/or operation centers, such as aircraft 406 and operation center 408, for example. In this illustrative example, aircraft 406 may transmit current environmental information for a current location and/or flight trajectory aircraft 406 is traveling to environmental waypoint insertion process 402. Environmental information points 417 may be a combination of information received from one or both of ground environmental information 414 and aircraft environmental information 416.

Ground environmental information 414 may include, without limitation, information collected from weather sources, such as, for example, without limitation, National Oceanic and Atmospheric Administration (NOAA). Ground environmental information 414 may also include information about weather local to a particular operation center, forecasted weather information for a number of locations, and/or any other suitable type of ground environmental information. Operation center 408 may be an illustrative example of one implementation of an operation center that sends environmental information to ground environmental information 414.

Aircraft environmental information 416 may include environmental information directly reported or derived from number of aircraft 415. Number of aircraft 415 may be an illustrative example of one implementation of number of aircraft 306 in FIG. 3, for example. Aircraft 406 may be an illustrative example of one implementation of an aircraft that directly sends currently observed environmental information to aircraft environmental information 416. Aircraft environmental information 416 may include information such as, without limitation, weather, temperature, pressure, humidity, turbulence, icing, wind speed, wind direction, wind vertical acceleration, thermal anti-icing for engine bleeds, atmospheric emissions, temperature deviations from standard atmospheric temperatures, barometric pressure, time of environmental data collection, and/or any other suitable information pertaining to a number of different points for a particular flight path and/or trajectory.

Aircraft current state data 420 includes information pertaining to a number of aircraft, such as number of aircraft 306 in FIG. 3. Aircraft current state data 420 may include a number of unique identifiers for the number of aircraft, such as tail numbers for example. Aircraft current state data 420 may identify a particular aircraft and include current state information about that particular aircraft, such as, without limitation, on-ground, climbing, cruising, descending, altitude, heading, weight, center of gravity, speed, and/or any other suitable state data.

Aircraft predictions 422 may include a number of flight plans, associated predictions, and aircraft intent for the trajectory of an aircraft based on each of the number of trajectories associated with the number of flight plans. Aircraft predictions 422 includes aircraft state data predictions associated with a number of points in time based on predicted weather, flight plan, weight of aircraft, aircraft configuration, and/or any other suitable information.

Environmental waypoint insertion process 402 includes assessment processor 403 and waypoint insertion manager 428. Assessment processor 403 assesses the value of information 404 to determine whether environmental information points are significant for inclusion in the flight plan or flight trajectory. Waypoint insertion manager 428 is used by environmental waypoint insertion process 402 to determine whether, when, and how to send waypoint insertion suggestions 444. Waypoint insertion manager 428 may include, without limitation, environmental point identification method 430, trajectory method 432, combination method 434, filters 436, formatter 438, and configuration information 440. In an illustrative example, environmental waypoint insertion process 402 may use one or more of waypoint insertion manager 428 in conjunction with assessment processor 403 to determine whether or not to send waypoint insertion suggestions 444.

Assessment processor 403 works in tandem with waypoint insertion manager 428 to assess environmental information points 417 based on the method or methods selected for processing using configuration information 440. In an illustrative example, configuration information 440 may indicate that environmental point identification method 430 is to be used to process environmental information points 417 and trajectory method 432 is used to process the output of environmental point identification method 430. Environmental waypoint insertion process 402 uses environmental point identification method 430 to identify a number of environmental information points 417 along a flight trajectory or flight plan and uses trajectory method 432 to generate pseudo waypoints using the output from environmental point identification method 430 along the flight plan or trajectory. Assessment processor 403 calculates the value of the environmental information points to determine which are significant for the trajectory or flight plan being considered based on configuration information 440, in this illustrative example.

In one advantageous embodiment, configuration information 440 may be predefined by a customer or default configuration. In another advantageous embodiment, waypoint insertion manager 428 may dynamically determine configuration information 440 using artificial intelligence which may measure current and past environments to determine how and when to suggest waypoints for insertion into a flight plan.

Environmental point identification method 430 identifies all environmental points along a trajectory and/or pertaining to a flight or flight plan, for example. In an illustrative example, a flight where only the origin and destination are known can be fed into the environmental waypoint insertion system. The system would then choose the applicable weather grids for the flight, in this illustrative example, based on the potential weather grids the flight may traverse since no specific trajectory is known. In another illustrative example, a specific trajectory for a flight may be known, and the system may identify environmental points specific to that trajectory. Environmental point identification method 430 may identify the environmental points according to the resolution of the grid from the available weather source, based on a static interval or configuration, or based on a dynamic determination or configuration. For example, a dynamic determination or configuration may be to select environmental points at every grid resolution by two nautical miles.

An environmental point is a four dimensional point with associated environmental information. The four dimensional point include latitude, longitude, altitude, and time. The associated environmental information is specific to each of the four dimensions of the point. In other words, the environmental information associated with an environmental point is for a specific latitude, longitude, altitude, and time. In one example, environmental point identification method 430 sends environmental points identified to assessment processor 403 to determine which of the environmental points identified along the trajectory includes significant environmental information.

The resolution of a weather source refers to the fidelity of the grid of environmental points available from that weather source. In an illustrative example, a first weather source may provide environmental information for a point every twelve kilometers in any direction, creating a grid of points where each point is twelve kilometers from any other point. In another illustrative example, a second weather source may provide environmental information for a point every ten kilometers in any direction, resulting in a higher fidelity grid than the first weather source, in these examples.

In another illustrative example, environmental point identification method 430 sends identified environmental points to trajectory method 432 to either partition the trajectory or generate a new trajectory based on configuration information 440. Trajectory method 432 may then send either the partitioned trajectory or the new trajectory along with the identified environmental information to assessment processor 403 to identify significant points. In this example, assessment processor 403 identifies the influence of weather on a flight plan from one point to another point along a trajectory. Assessment processor 403 may recognize flight waypoints, pseudo waypoints, weather waypoints, environmental points, and any other suitable point as a point that identifies a trajectory. A new trajectory may include data such as, without limitation, fuel burn, estimated times of arrival, and/or other suitable information.

Trajectory method 432 may either partition a flight trajectory based on a pre-configured variable into several segments with pseudo waypoints or calculates a new flight trajectory. Trajectory method 432 may associate environmental points with pseudo waypoints. For example, trajectory method 432 may directly associate the closest environmental information with a pseudo waypoint, or may calculate environmental information for a pseudo waypoint through interpolation.

If trajectory method 432 has already received environmental information from environmental point identification method 430, trajectory method 432 sends the analyzed pseudo waypoint with environmental points to assessment processor 403 to determine which points include significant environmental information. If there is no environmental information associated with the pseudo waypoints, trajectory method 432 sends the partitioned trajectory or segments to environmental point identification method 430 for environmental point identification.

The pre-configured variable may be a default variable or a customer configured variable identified using configuration information 440, for example. The pre-defined variable may be a static or dynamic variable. A static variable may be, without limitation, a set distance interval, for example. A dynamic variable may be, without limitation, intervals dependent upon a grid resolution, intervals depending upon aircraft current state data 420, intervals depending upon a time variance, and/or any other suitable interval. In an illustrative example, intervals depending upon aircraft current state data 420 may be configured to use an interval of 0.1 nm through the climb phase of a flight plan and an interval of 0.5 nm through a cruise phase of a flight plan. Intervals depending upon a time variable may be intervals depending upon a given range outside an acceptable threshold variance between expected time of arrival and estimated time of arrival for a given waypoint or destination, in an illustrative example.

In an illustrative example, the pre-configured variable may be set to partition at greater than 800 nautical miles (nm) into ten nautical mile segments. In this example, partition method will partition any segment or leg of a flight trajectory that is greater than 800 nm, where a segment or leg is defined as a section of a trajectory between two waypoints. The segment or leg that is partitioned will be divided into segments of ten nautical miles each, with a pseudo waypoint marking the point for each ten nautical miles, resulting in a number of pseudo waypoints at ten nautical mile distances from each other for the length of the 800 nm segment.

Trajectory method 432 may send the partitioned segments to environmental point identification method 430 to identify which of environmental information points 417 fall along the partitioned segments. Once the environmental information points have been identified by environmental point identification method 430 for the partitioned segments, trajectory method 432 associates the environmental points at each pseudo waypoint in the partitioned segments, analyzes the partitioned segment using the associated environmental points, and sends the pseudo waypoints and trajectory data to assessment processor 403 to determine the points of significance.

Combination method 434 combines environmental point identification method 430 with trajectory method 432. For example, in segments of a flight trajectory where a finer resolution from an existing environmental source is not available in order to reach a desired result with environmental point identification method 430, trajectory method 432 is used to create pseudo waypoints.

In an illustrative example, if there is a high fidelity grid that includes environmental waypoints every one nautical mile, it may require too much processing to identify all the environmental points along the trajectory using environmental point identification method 430, and then create waypoints and associate the environmental information with each of the waypoints using trajectory method 432. In this example, combination method 434 may first partition segments of a given size, for example 800 nautical miles (nm), into 80 nm segments using trajectory method 432. Then, only the newly partitioned segments, rather than the entire trajectory, may be sent to environmental point identification method 430 to determine the weather along those segments. Environmental point identification method 430 may then send back the environmental information to trajectory method 432 to associate weather for each waypoint in that segment and calculate or update estimated times of arrival, fuel burn, and other information.

Filters 436 receives the output from one or more of environmental point identification method 430, assessment processor 403, trajectory method 432, and/or combination method 434, and filters the output based on configuration information 440. Filters 436 send the filtered output to formatter 438.

Formatter 438 receives the filtered output from filters 436, and formats the filtered output based on configuration information 440 before outputting waypoint insertion suggestions 444. Formatter 438 must know the destination of waypoint insertion suggestions 444 before formatting the filtered output to generate waypoint insertion suggestions 444. The desired format is determined from the destination or recipient. For example, a message to the airline operation center may have one format and a message to the aircraft may have another format.

Configuration information 440 allows a subscriber to configure variables used by waypoint insertion manager 428. A subscriber may use configuration information 440 to override default settings of each of waypoint insertion manager 428 and/or input variables, pre-defined values, and other information used by waypoint insertion manager 428, such as the pre-configured values used by trajectory method 432, for example. Variables may include, without limitation, a degree of resolution required for flight plans or segments of flight plans, an acceptable degree of variance between flight time parameters, a desired number of suggested weather waypoints, a desired format for suggested weather waypoints, whether a particular variable is static or dynamic, and/or any other suitable variable. A subscriber may also use configuration information 440 to ignore any manual triggers, such as manual trigger 450 having customer configuration 452, or to use a manual trigger to make a final determination on whether and/or when to send waypoint insertion suggestions 444.

Waypoint insertion suggestions 444 are configured by formatter 438 for transmission to the recipient of waypoint insertion suggestions 444. Formatter 438 may identify a number of data formats capable of being received by a particular recipient, such as aircraft 406 or operation center 408 for example. As used herein, "a number of data formats" refers to one or more data formats.

In one illustrative example, aircraft 406 may be able to receive waypoint insertion suggestions 444 as a suggested new waypoint for a flight plan, where pseudo waypoints and weather waypoints are associated with real waypoint names currently existing in an associated location to the pseudo waypoint and/or weather waypoint. In another illustrative example, waypoint insertion suggestions 444 may be sent in a specific data format preferred by operation center 408.

In one illustrative example, waypoint insertion suggestions 444 may be formatted for transmission to aircraft 406, and sent as uplink to aircraft 446. In another illustrative example, waypoint insertion suggestions 444 may be formatted for transmission to operation center 408, and sent as message to ground 448.

Waypoint insertion suggestions 444 may be sent as either or both uplink to aircraft 446 and message to ground 448. If environmental waypoint insertion process 402 determines that environmental information does not meet a significant threshold based on configuration information 440 using filters 436, no transmission is sent unless manual trigger 450 overrides the automated process, and environmental waypoint insertion process 402 continues to evaluate information 404 as it is received and/or obtained.

Alternatively, manual trigger 450 may be a trigger that may be initiated based on customer configuration 452. For example, manual trigger 450 may be triggered by a subscriber, such as operation center 408 for example, based on customer configuration 452 that subscriber operation center 408 modified using desired parameters.

For example, in one advantageous embodiment, a manual request may be initiated from any qualified subscriber of the environmental waypoint insertion system. In another advantageous embodiment, manual and automatic triggers can be used to reinitialize the process given a new set of conditions. An example of this may be flight plan modifications. In this example, one weather solution with waypoint insertion suggestions may have been computed according to the initial flight path of an aircraft, but the aircrew or a subscriber desires to view the solution using a different flight path before executing that maneuver. A request may be sent with the new proposed flight plan and a new solution may be generated, in this illustrative example of a flight plan modification.

The illustration of environmental waypoint insertion system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
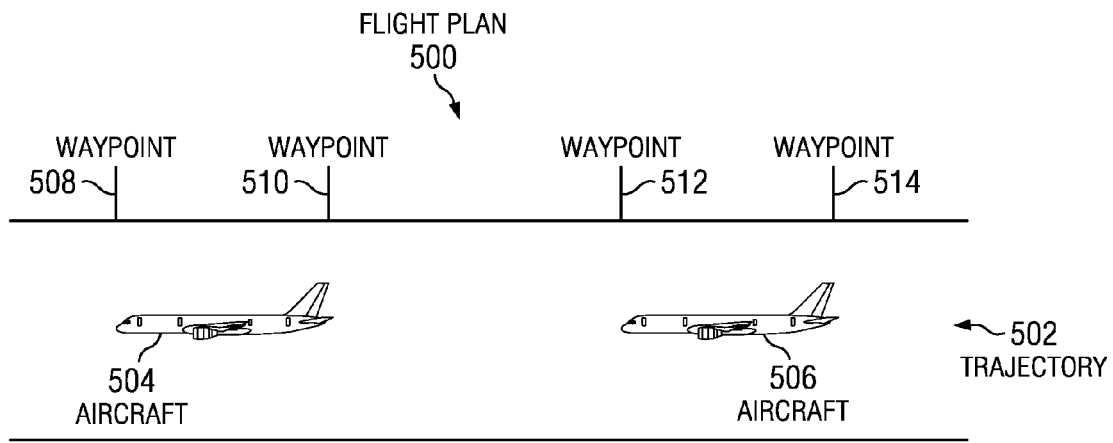
FIG. 5 is an illustration of a flight plan in accordance with an advantageous embodiment.

With reference now to FIG. 5, an illustration of a flight plan is depicted in accordance with an advantageous embodiment. Flight plan 500 may be an illustrative example of one implementation of a flight plan sent through request 405 or push 407 in FIG. 4.

Flight plan 500 may include trajectory 502. Aircraft 504 may travel along trajectory 502 earlier in time than aircraft 506. During the time that aircraft 504 follows trajectory 502 of flight plan 500, aircraft 504 may experience various weather factors at different points along trajectory 502, such as waypoint 508, waypoint 510, waypoint 512, and waypoint 514. Aircraft 504 and aircraft 506 may directly relay environmental information at each of waypoints 508, 510, 512, and 514 to an operation center and/or aircraft environmental database, such as operation center 408 or aircraft environmental information 416 in FIG. 4, for example. Environmental information may include, for example, without limitation, temperature, atmospheric pressure, turbulence, wind speed, wind direction, altitude, the current and predicted phase of flight, time of environmental data collection, and/or any other suitable information.

When aircraft 506 follows trajectory 502 along flight plan 500 at a later time than aircraft 504, aircraft 506 may receive the benefit of the environmental information detected by aircraft 504 as well as the current environmental information detected by aircraft 506. The current environmental information detected by aircraft 506 may also be used to update the dated environmental information in the onboard computer of aircraft 506. The dated environmental information may be, for example, the environmental information detected earlier in time by aircraft 504, and/or environmental information uploaded preflight into the onboard computer of aircraft 506. In an illustrative example, aircraft 506 may request additional suggested waypoints for flight plan 500 from a system, such as environmental waypoint insertion system 400 in FIG. 4. The system can access the most recently acquired environmental information for trajectory 502 to determine the environmental information that is pertinent to aircraft 506. Additionally, the system can determine whether or not there are significant environmental points based on customer configuration for aircraft 506 when determining whether there are any waypoint insertions to suggest. The information obtained by aircraft 504 along trajectory 502 may be used to anticipate the environmental factors aircraft 506 will encounter on waypoints 508, 510, 512, and 514 of trajectory 502 for flight plan 500. Additionally, current environmental information detected by aircraft 506 along trajectory 502 may also be used to update onboard environmental information and anticipate the environmental factors aircraft 506 will encounter on upcoming waypoints 508 and 510 along trajectory 502.

Figure 6:
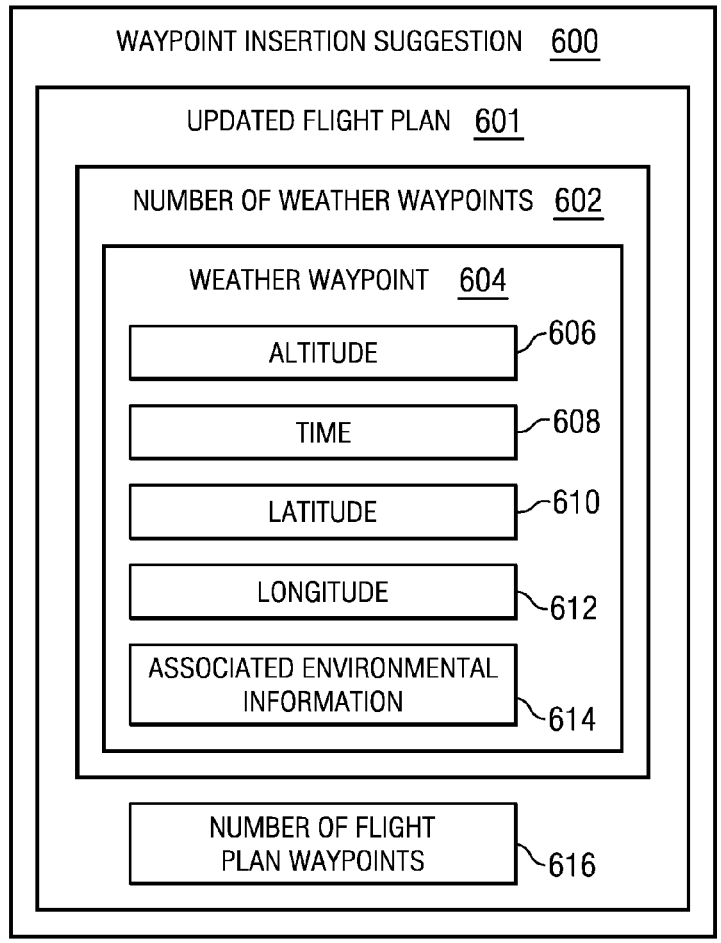
FIG. 6 is an illustration of a waypoint insertion suggestion in accordance with an advantageous embodiment.

With reference now to FIG. 6, an illustration of a waypoint insertion suggestion is depicted in accordance with an advantageous embodiment. Waypoint insertion suggestion 600 may be an example of waypoint insertion suggestions 444 in FIG. 4.

Waypoint insertion suggestion 600 may include updated flight plan 601. Updated flight plan 601 includes number of weather waypoints 602 and number of flight plan waypoints 616. Weather waypoint 604 is an illustrative example of one implementation of number of weather waypoints 602. Weather waypoint 604 includes information such as, without limitation, altitude 606, time 608, latitude 610, longitude 612, and associated environmental information 614. Associated environmental information 614 may include, without limitation, temperature, atmospheric pressure, anti-ice levels, wind speed, wind direction, and/or any other suitable information specific to weather waypoint 604.

Number of flight plan waypoints 616 may be existing or original waypoints to the flight plan before the flight plan was updated. Number of flight plan waypoints 616 may be updated by environmental waypoint insertion system 400 in FIG. 4 to associate environmental information with one or more of number of flight plan waypoints 616, for example.

The illustration of waypoint insertion suggestion 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, number of weather waypoints 602 may be implemented without associated environmental information 614.

Figure 7:
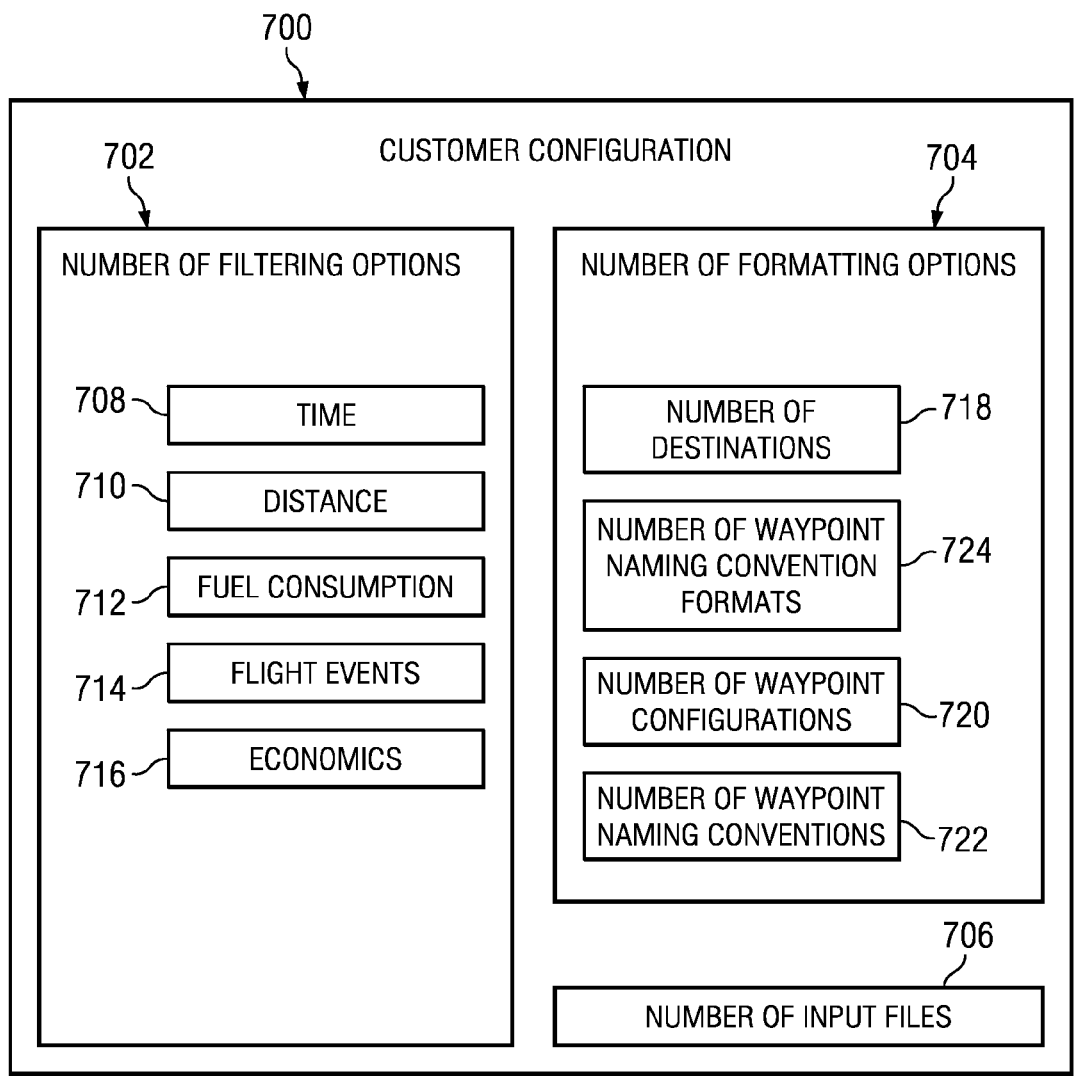
FIG. 7 is an illustration of a customer configuration in accordance with an advantageous embodiment.

With reference now to FIG. 7, an illustration of a customer configuration is depicted in accordance with an advantageous embodiment. Customer configuration 700 may be an illustrative embodiment of one implementation of configuration information 440 and/or customer configuration 452 in FIG. 4.

Customer configuration 700 may include, without limitation, number of filtering options 702, number of formatting options 704, number of input files 706, and/or any other suitable configuration options.

Number of filtering options 702 may include, for example, without limitation, time 708, distance 710, fuel consumption 712, flight events 714, economics 716, and/or any other suitable configuration option.

Number of formatting options 704 may include, for example, without limitation, number of destinations 718, number of waypoint configurations 720, number of waypoint naming conventions 722, number of waypoint naming convention formats 724, and/or any other suitable trigger. Number of waypoint naming conventions 722 may be governed by existing regulatory entities or standard aviation navigation components, such as a flight management computer, for example. The identifier of the formats for generating waypoint insertion suggestion 444 in FIG. 4 may be stated in customer configuration 700 and identified using number of waypoint naming convention formats 724, for example.

Number of input files 706 may include, without limitation, flight plans, trajectories, configuration files, and/or any other suitable input file.

Figure 8:
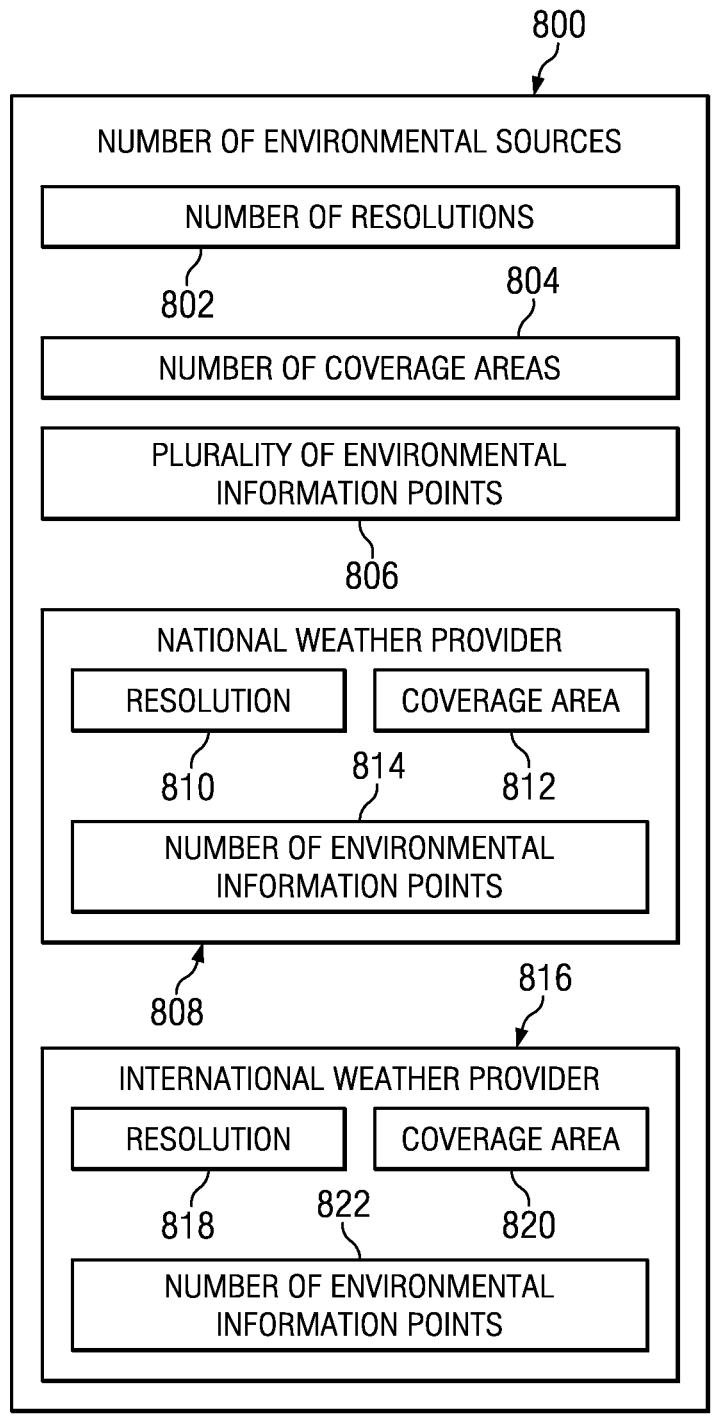
FIG. 8 is an illustration of a number of environmental sources in accordance with an advantageous embodiment.

With reference now to FIG. 8, an illustration of a number of environmental sources is depicted in accordance with an advantageous embodiment. Number of environmental sources 800 is an illustrative example of one implementation of number of other ground systems 305 in FIG. 3 and/or number of environmental sources 413 in FIG. 4.

Number of environmental sources 800 includes number of resolutions 802, number of coverage areas 804, and plurality of environmental information points 806. Number of resolutions 802 may correspond to number of coverage areas 804. For example, each environmental source may have a given resolution for a given coverage area, in one illustrative example. Plurality of environmental information points 806 is associated with number of resolutions 802. For example, a given resolution will include a given number of environmental information points.

National weather provider 808 is an illustrative example of one implementation of an environmental source from number of environmental sources 800. National weather provider 808 provides environmental information at resolution 810 for coverage area 812 using number of environmental information points 814. International weather provider 816 is another illustrative example of one implementation of an environmental source from number of environmental sources 800. International weather provider 816 provides environmental information at resolution 818 for coverage area 820 using number of environmental information points 822.

In these illustrative examples, resolution 810 for national weather provider 808 may be a finer resolution, or higher fidelity resolution than resolution 818 for international weather provider 816. Accordingly, number of environmental information points 814 for national weather provider 808 may be more plentiful, or a more dense grid, than number of environmental information points 822 for international weather provider 816, in these illustrative examples.

Figure 9:
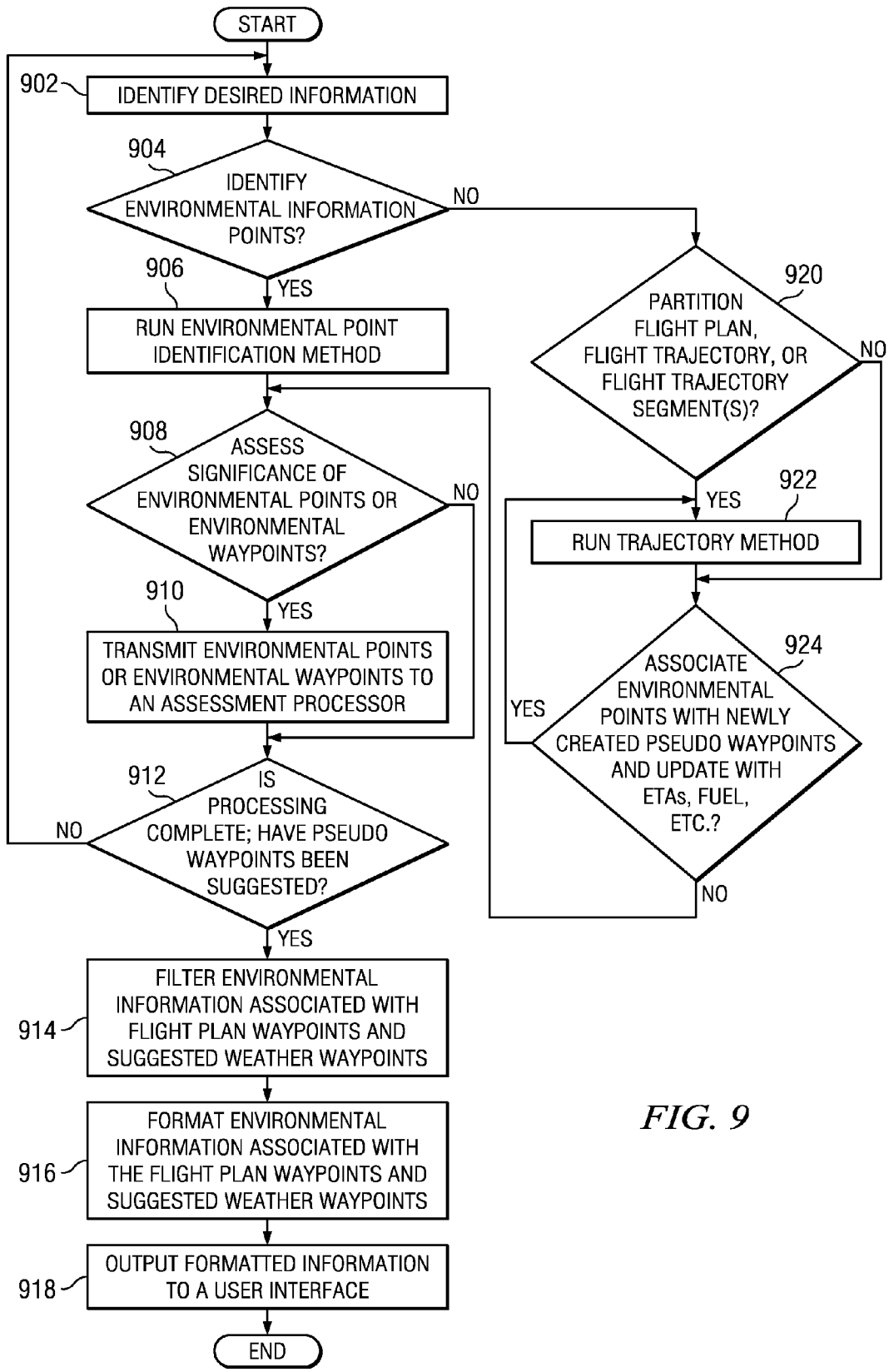
FIG. 9 is an illustration of a flowchart of a process for insertion of environmental waypoints in accordance with an advantageous embodiment.

With reference now to FIG. 9, an illustrative example of a process for insertion of environmental waypoints is depicted in accordance with an advantageous embodiment. The process in FIG. 9 may be implemented by a component such as environmental waypoint insertion process 402 in FIG. 4 executing waypoint insertion manager 428, for example.

The process begins by identifying desired information (operation 902). The process may determine what information currently exists and what information is needed, for example. In this example, the information that currently exists may be weather, a trajectory of a flight plan, or both. The desired information may be the information needed to complete and/or update a flight plan, for example.

In one advantageous embodiment, the desired information may determine which method to run in order to suggest weather waypoints, for example. In another advantageous embodiment, the order of which method to run at which point in the process may be predefined based on a configuration, such as configuration information 440 in FIG. 4, for example.

The process determines whether to identify environmental information points (operation 904). This determination may be based on the information identified as desired information in operation 902, for example. This determination may also be based on configuration information, for example. If the process determines that identification of environmental information points is needed, the process runs an environmental point identification method (operation 906). The environmental point identification method may identify a number of environmental information points along a trajectory of a flight plan, for example. This method identifies the number of environmental points using a grid of environmental points for the area in which the flight plan trajectory passes through for a geographic region, for example. The grid of environmental points may be loaded and the process identifies which of the points are along the trajectory.

The process determines whether to assess the significance of environmental points or environmental waypoints (operation 908). If the process determines to assess the significance of environmental points or environmental waypoints, the process transmits the environmental points or the environmental waypoints to an assessment processor (operation 910). An assessment processor, such as assessment processor 403 in FIG. 4, may determine the significance of environmental points or environmental waypoints. In an illustrative example, configuration information may indicate values for a number of variables that are used to determine which environmental information points will be considered significant. For example, a variable may set forth a time variance value that identifies a threshold value for acceptable estimated times of arrival (ETAs) and provides an indication that anything causing a value outside the threshold value is significant environmental information.

If the process determines not to assess the significance of environmental points or environmental waypoints, the process skips to operation 912. The process determines whether processing is complete; have pseudo waypoints been suggested? (operation 912). If the process determines that the processing is not complete, it returns to operation 902. If the process determines that the processing is complete, the process then filters environmental information associated with the flight plan waypoints and suggested weather waypoints (operation 914). The process formats environmental information associated with the flight plan waypoints and suggested weather waypoints (operation 916) and outputs formatted information to a user interface (operation 918), with the process terminating thereafter.

If the process in operation 904 determines that identification of environmental information points is not needed, the process determines whether to partition a flight plan, flight trajectory, or flight trajectory segments (operation 920). If a determination is made to partition, the process runs a trajectory method (operation 922). The trajectory method partitions the flight plan and inserts a number of pseudo waypoints. If a determination is made not to partition, the process skips to operation 924.

The process determines whether to associate environmental points with newly created pseudo waypoints and update with estimated times of arrival, fuel burn, and other information (operation 924). If a determination is made to associate environmental points with newly created pseudo waypoints and update with estimated times of arrival, fuel burn, and other information, the process returns to operation 922. If a determination is made not to associate environmental points with newly created pseudo waypoints and update with estimated times of arrival, fuel burn, and other information, the process returns to operation 908.

The process in FIG. 9 is an illustrative example of one order of steps and is not meant to limit the process executed by waypoint insertion manager 428 in FIG. 4. In another advantageous embodiment, the steps illustrated in FIG. 9 may be performed in one or more different orders, run by waypoint insertion manager 428.

Figure 10:
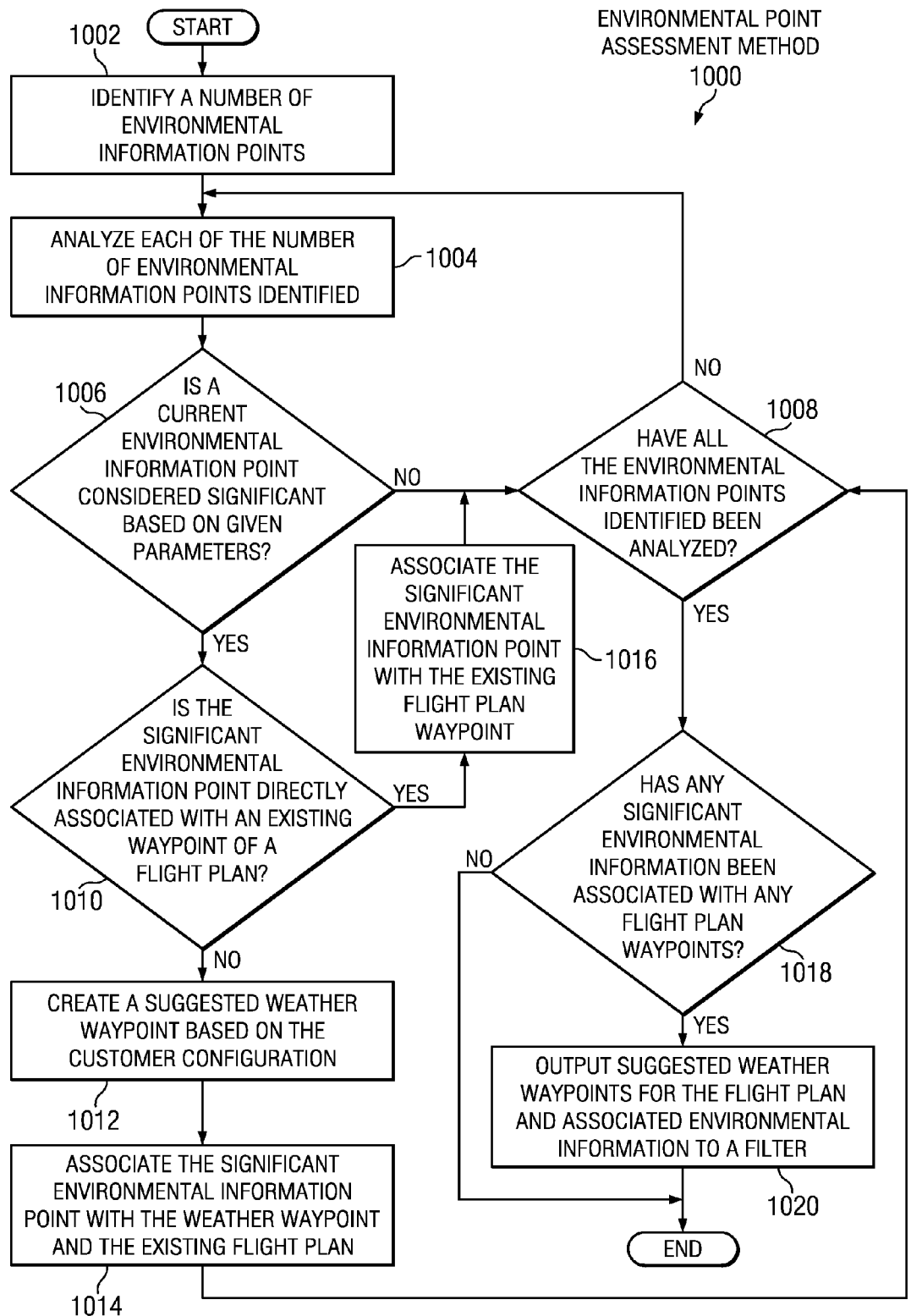
FIG. 10 is an illustration of a flowchart of a process for insertion of environmental waypoints using an environmental points identification method in accordance with an advantageous embodiment.

With reference now to FIG. 10, an illustrative example of a process for insertion of waypoints using an environmental point identification method is depicted in accordance with an advantageous embodiment. The process in FIG. 10 may be implemented by a component such as environmental waypoint insertion process 402 in FIG. 4 executing waypoint insertion manager 428, for example.

This process begins by identifying a number of environmental information points (operation 1002). The process analyzes each of the number of environmental information points identified (operation 1004). The process determines whether a current environmental information point is considered significant based on given parameters (operation 1006). This determination may be performed using an assessment processor, such as assessment processor 403 in FIG. 4, for example. The given parameters may be from configuration information, such as configuration information 440 in FIG. 4. The configuration information may indicate values for a number of variables that are used to determine which environmental information points will be considered significant based on the given parameters. For example, a variable may set forth a time variance value that identifies a threshold value for acceptable estimated times of arrival ETAs and provides an indication that anything causing a value outside the threshold value is significant environmental information.

If the process determines that the current environmental information point being considered is not significant, the process then determines whether all the environmental information points identified have been analyzed (operation 1008). If the process determines that all the environmental information points identified have not been analyzed, the process returns to operation 1004.

If the process determines at operation 1006 that the current environmental information point being considered is significant based on the given parameters, the process then determines whether the significant environmental information point is directly associated with an existing waypoint of a flight plan (operation 1010). If the process determines that the significant environmental information point is not directly associated with an existing waypoint of the flight plan, the process creates a suggested weather waypoint based on the given parameters (operation 1012). The process then associates the significant environmental information point with the weather waypoint and the existing flight plan (operation 1014), and proceeds to operation 1008. Associating the significant environmental information point with a waypoint includes associating the estimated time of arrival and fuel burn for each waypoint.

If the process determines in operation 1010 that the significant environmental information point is directly associated with an existing waypoint of the flight plan, the process associates the significant environmental information point with the existing flight plan waypoint (operation 1016), and proceeds to operation 1008.

If the process determines in operation 1008 that all of the environmental information points identified have been analyzed, the process then determines whether any significant environmental information has been associated with any flight plan waypoints (operation 1018). If the process determines that no significant environmental information has been associated with any flight plan waypoints, the process terminates.

If the process determines that significant environmental information has been associated with any flight plan waypoints, the process then outputs suggested weather waypoints for the flight plan and associated environmental information to a filter (operation 1020), with the process terminating thereafter. The filter may be, for example, filters 436 of environmental waypoint insertion process 402 in FIG. 4. The process illustrated in FIG. 10 is not meant to imply physical or architectural limitations to the manner in which different advantageous embodiments may be implemented. Other processes or logic decision components in addition to and/or in place of the ones illustrated may be used. Some components may be unnecessary in some advantageous embodiments.

Figure 11:
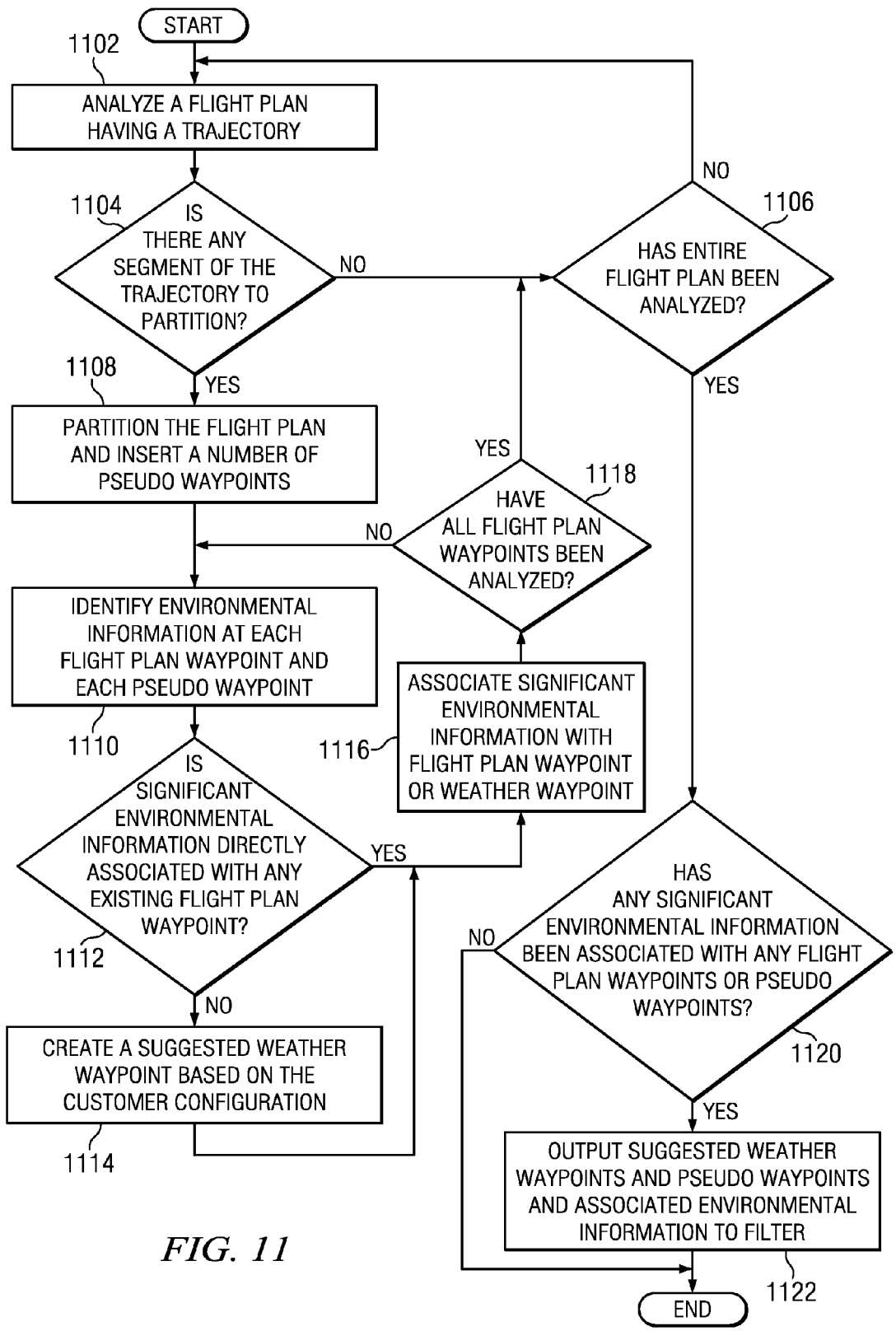
FIG. 11 is an illustration of a flowchart of a process for insertion of environmental waypoints using a partition method in accordance with an advantageous embodiment.

With reference now to FIG. 11, an illustration of a flowchart of a process for insertion of environmental waypoints using a partition method is depicted in accordance with an advantageous embodiment. The process in FIG. 11 may be implemented by a component such as environmental waypoint insertion process 402 in FIG. 4 executing waypoint insertion manager 428, for example.

The process begins by analyzing a flight plan having a trajectory (operation 1102). The process determines whether there is any segment of the trajectory to partition (operation 1104). The determination as to whether there is any segment to partition may be based on configuration information, in one illustrative example. In another illustrative example, the determination may be based on the available remaining processing for the system as a whole. If the process determines that there is no segment of the trajectory to partition, the process determines whether the entire flight plan has been analyzed (operation 1106). If the process determines that the entire flight plan has not been analyzed, the process returns to operation 1102.

If the process determines in operation 1104 that there is a segment of the trajectory to partition, the process then partitions the flight plan and inserts a number of pseudo waypoints (operation 1108). The process then identifies environmental information at each flight plan waypoint and each pseudo waypoint (operation 1110).

The process determines whether there is significant environmental information directly associated with any existing flight plan waypoint (operation 1112). The process may use an assessment processor, such as assessment processor 403 in FIG. 4 to determine the significance of an environmental point using customer configuration information. If the process determines that there is no significant environmental information point directly associated with an existing waypoint of the flight plan, the process creates a suggested weather waypoint based on the customer configuration (operation 1114). The process then associates the significant environmental information with the flight plan waypoint or weather waypoint (operation 1116).

The process then determines whether all flight plan waypoints have been analyzed (operation 1118). If the process determines that all flight plan waypoints have been analyzed, the process proceeds to operation 1106. If the process determines that all flight plan waypoints have not been analyzed, the process returns to operation 1110. If the process determines at operation 1112 that there is significant environmental information point directly associated with an existing waypoint of the flight plan, the process proceeds directly to operation 1116.

If the process determines at operation 1106 that the entire flight plan has been analyzed, the process then determines whether any significant environmental information has been associated with any flight plan waypoint or pseudo waypoint (operation 1120). If the process determines that no significant environmental information has been associated with any flight plan waypoint or pseudo waypoint, the process terminates.

If the process determines that significant environmental information has been associated with any flight plan waypoint or pseudo waypoint, the process then outputs the suggested weather waypoints and pseudo waypoints and associated environmental information to a filter (operation 1122), with the process terminating thereafter.

Figure 12:
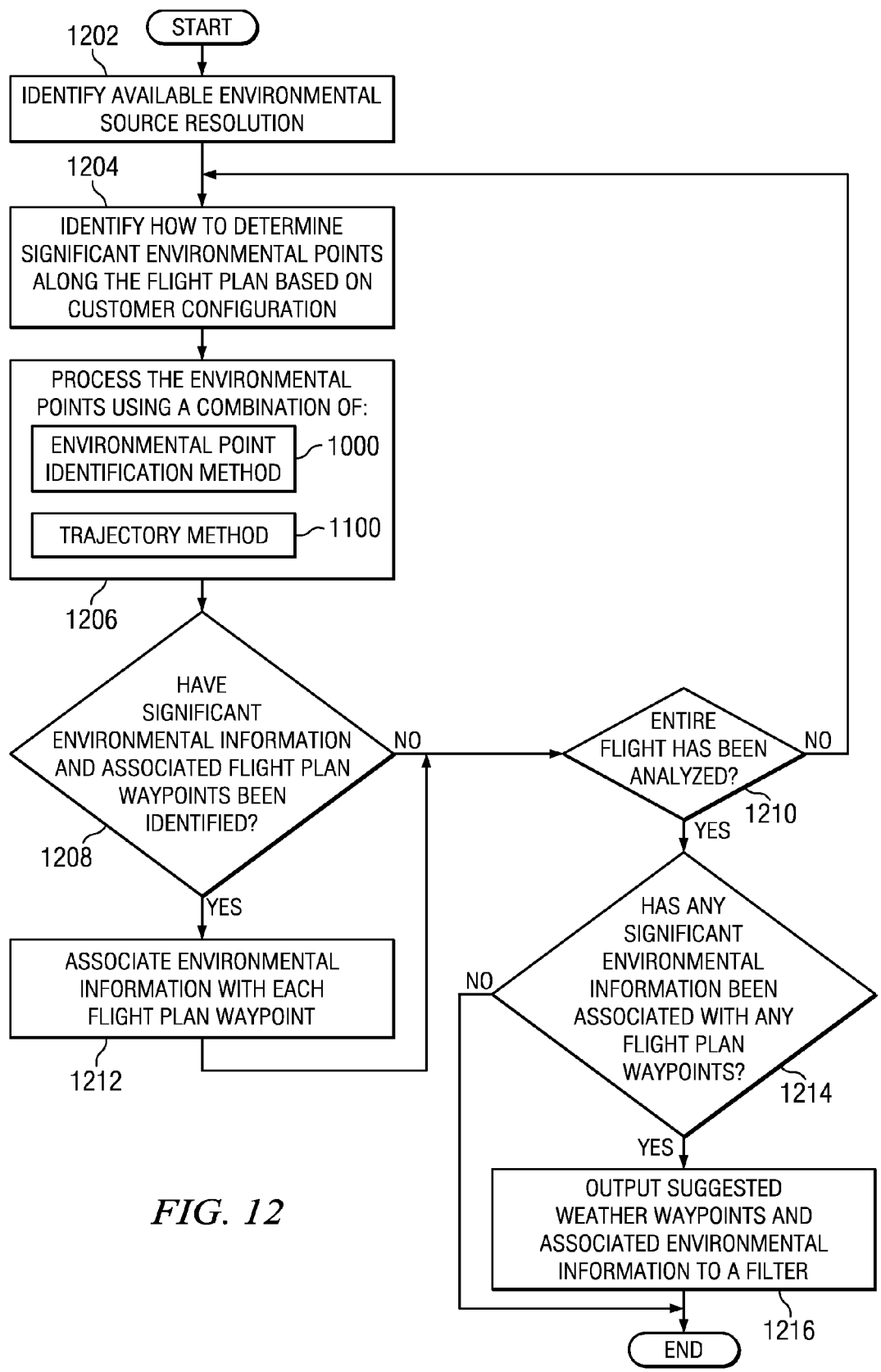
FIG. 12 is an illustration of a flowchart of a process for insertion of environmental waypoints using a combination method in accordance with an advantageous embodiment.

With reference now to FIG. 12, an illustration of a flowchart of a process for insertion of environmental waypoints using a combination method is depicted in accordance with an advantageous embodiment. The process in FIG. 12 may be implemented by a component such as environmental waypoint insertion process 402 in FIG. 4 executing waypoint insertion manager 428, for example.

The process begins by identifying available environmental source resolution (operation 1202). The process identifies how to determine significant environmental points along the flight plan based on customer configuration (operation 1204). Customer configuration may specify a particular method or combination of methods, or a desired resolution of results, for example.

The process then processes the environmental points using a combination of environmental point identification method 1000 and trajectory method 1100 (operation 1206). The process determines whether significant environmental information and associated flight plan waypoints have been identified (operation 1208). If the process determines that there is no significant environmental information with each flight plan waypoint the process then determines whether the entire flight plan has been analyzed (operation 1210). If the process determines that the entire flight plan has not been analyzed, the process returns to operation 1204. If the process determines that significant environmental information and associated flight plan waypoints have been identified the process then associates the environmental information with each flight plan waypoint (operation 1212). If the process determines that the entire flight plan has been analyzed, the process then determines whether any significant environmental information has been associated with any flight plan waypoints (operation 1214). If the process determines that no significant environmental information has been associated with any flight plan waypoints, the process terminates. If the process determines that significant environmental information has been associated with any flight plan waypoints, the process outputs suggested weather waypoints and associated environmental information to a filter (operation 1216), with the process terminating thereafter.

Figure 13:
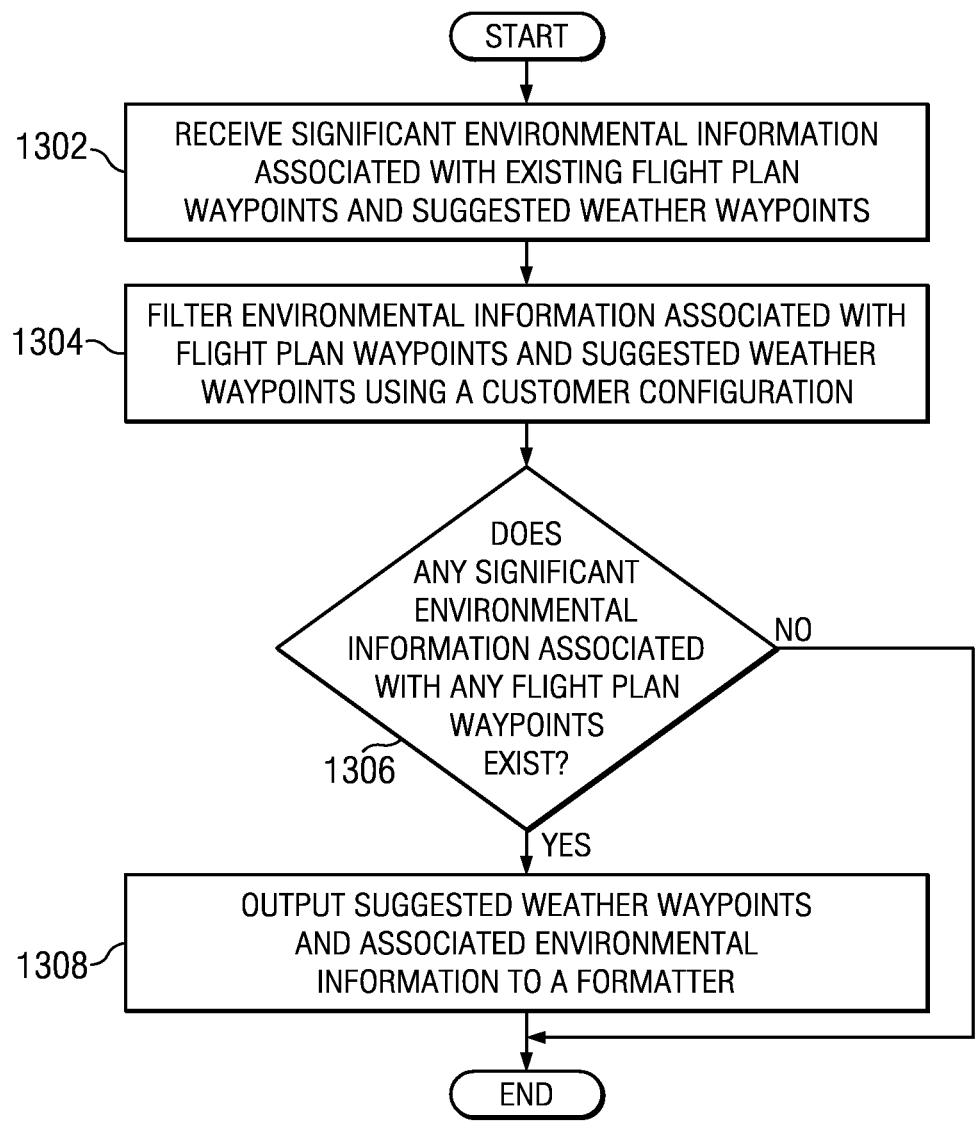
FIG. 13 is an illustration of a flowchart of a process for filtering environmental information in accordance with an advantageous embodiment.

With reference now to FIG. 13, an illustration of a flowchart of a process for filtering environmental information is depicted in accordance with an advantageous embodiment. The process in FIG. 13 may be implemented by a component such as environmental waypoint insertion process 402 in FIG. 4 executing waypoint insertion manager 428, for example.

The process begins by receiving significant environmental information associated with existing flight plan waypoints and suggested weather waypoints (operation 1302). The process filters environmental information associated with flight plan waypoints and suggested weather waypoints using a customer configuration (operation 1304).

The process then determines whether any significant environmental information associated with any flight plan waypoint exists (operation 1306). The process may determine whether environmental information is significant based on given parameters, such as configuration information 440 in FIG. 4, for example.

If the process determines that significant environmental information associated with any flight plan waypoint does not exist, the process terminates. If the process determines that significant environmental information associated with any flight plan waypoint exists, the process then outputs suggested weather waypoints and associated environmental information to a formatter (operation 1308), with the process terminating thereafter.

Figure 14:
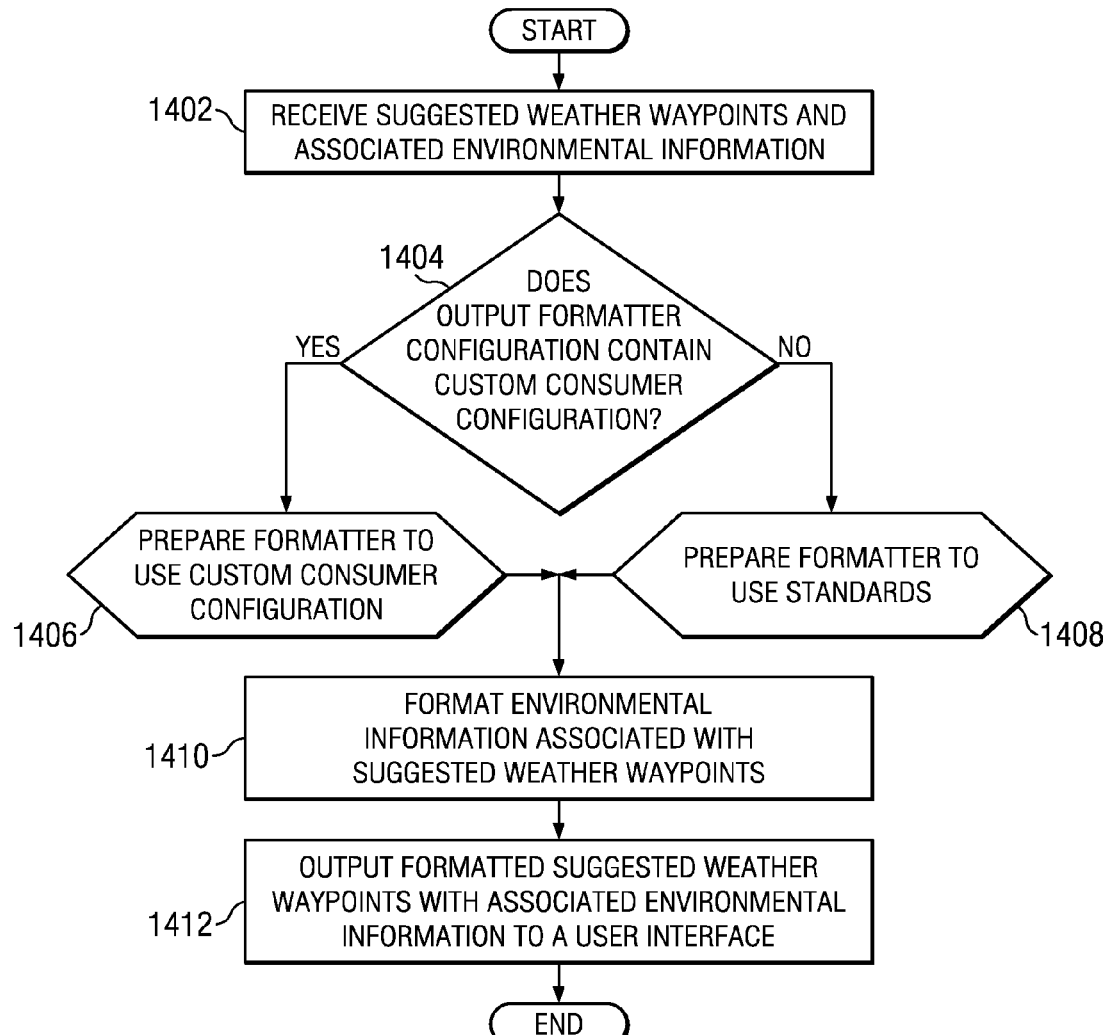
FIG. 14 is an illustration of a flowchart of a process for formatting weather waypoints in accordance with an advantageous embodiment.

With reference now to FIG. 14, an illustration of a flowchart of a process for formatting weather waypoints is depicted in accordance with an advantageous embodiment. The process in FIG. 14 may be implemented by a component such as environmental waypoint insertion process 402 in FIG. 4 executing waypoint insertion manager 428, for example.

The process begins by receiving suggested weather waypoints and associated environmental information (operation 1402). This information may be received from a filter, such as filters 436 in FIG. 4, for example.

The process determines whether the output formatter configuration contains custom consumer configuration (operation 1404). Custom consumer configuration for output may be pre-defined in configuration information, such as configuration information 440 in FIG. 4, for example.

If the process determines that the output formatter configuration contains custom consumer configuration, the process prepares the formatter to use custom consumer configurations (operation 1406). If the process determines that the output formatter configuration contains no custom consumer configuration, the process prepares the formatter to use standards (operation 1408). Standards may be industry standards following ARINC specifications, in an illustrative example. For example, standards may include DO258A, ARINC 620, Type B messaging, and/or any other suitable standard.

The process formats the environmental information associated with the suggested weather waypoints (operation 1410). The process then outputs formatted suggested weather waypoints with associated environmental information to a user interface (operation 1412), with the process terminating thereafter.

Figure 15:
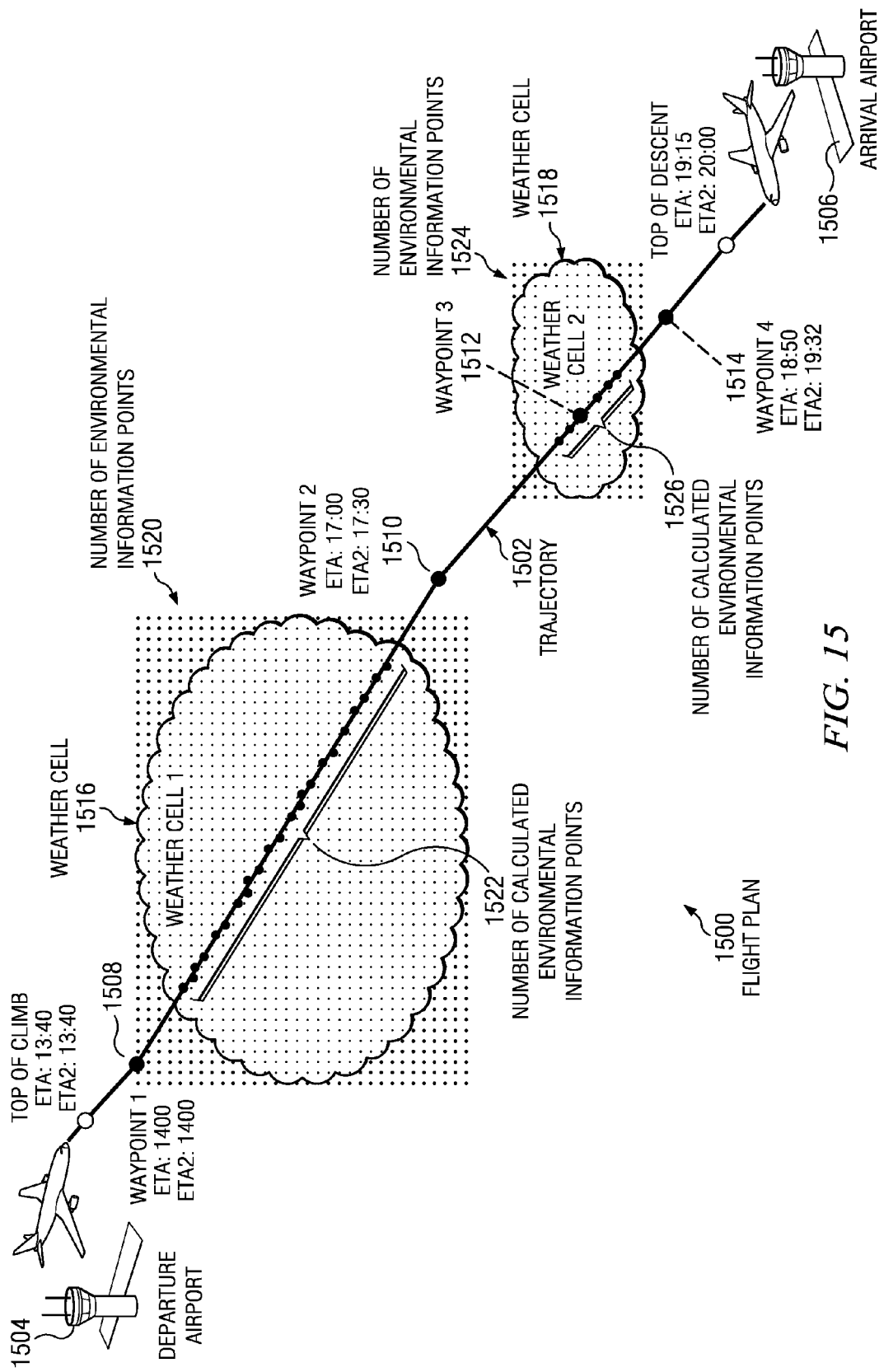
FIG. 15 is an illustration of a flight plan in accordance with an advantageous embodiment.

With reference now to FIG. 15, an illustration of a flight plan is depicted in accordance with an advantageous embodiment. Flight plan 1500 may be an illustrative example of one implementation of flight plan 500 in FIG. 5.

Flight plan 1500 includes trajectory 1502. Trajectory 1502 defines the path of travel for an aircraft between departure airport 1504 and arrival airport 1506 using flight plan 1500. Trajectory 1502 includes waypoint 1508, waypoint 1510, waypoint 1512, and waypoint 1514. Waypoints 1508, 1510, 1512, and 1514 are waypoints of trajectory 1502 for flight plan 1500. A waypoint is a reference point in physical space used for navigation by an aircraft, such as aircraft 314 in FIG. 3 using flight plan 1500.

Weather cell 1516 and weather cell 1518 may be environmental cells along trajectory 1502 that affect a number of factors for an aircraft using flight plan 1500. For example, the number of factors that may be affected by environmental cells may include, without limitation, speed, actual times of arrival at a waypoint or destination, fuel consumption, and/or any other suitable factor.

In order for an aircraft using flight plan 1500 to become aware of these environmental cells that may affect travel, a system is used to determine environmental information for areas along trajectory 1502 and use the information to suggest additional waypoints for insertion into flight plan 1500. The system may be, for example, environmental waypoint insertion system 400 in FIG. 4.

The system may identify number of environmental information points 1520 associated with the segment of flight plan 1500 between waypoint 1508 and waypoint 1510. Number of environmental information points 1520 is an illustrative example of one implementation of environmental information points 332 in FIG. 3. Number of environmental information points 1520 represent a grid, or resolution, available from a given weather source providing number of environmental information points 1520.

The system identifies which of number of environmental information points 1520 are associated with trajectory 1502. These associated points identified by the system form number of calculated environmental information points 1522. Number of calculated environmental information points 1522 may be an example of environmental information points along a trajectory that are analyzed to determine ETAs and fuel burn for each point, such as in operation 904 in FIG. 9, for example.

The system may also identify number of environmental information points 1524 for the segment of flight plan 1500 surrounding waypoint 1512. Number of calculated environmental information points 1526 represents the environmental information points associated with trajectory 1502 for the segment of number of environmental information points 1524 surrounding waypoint 1512.

Figure 16:
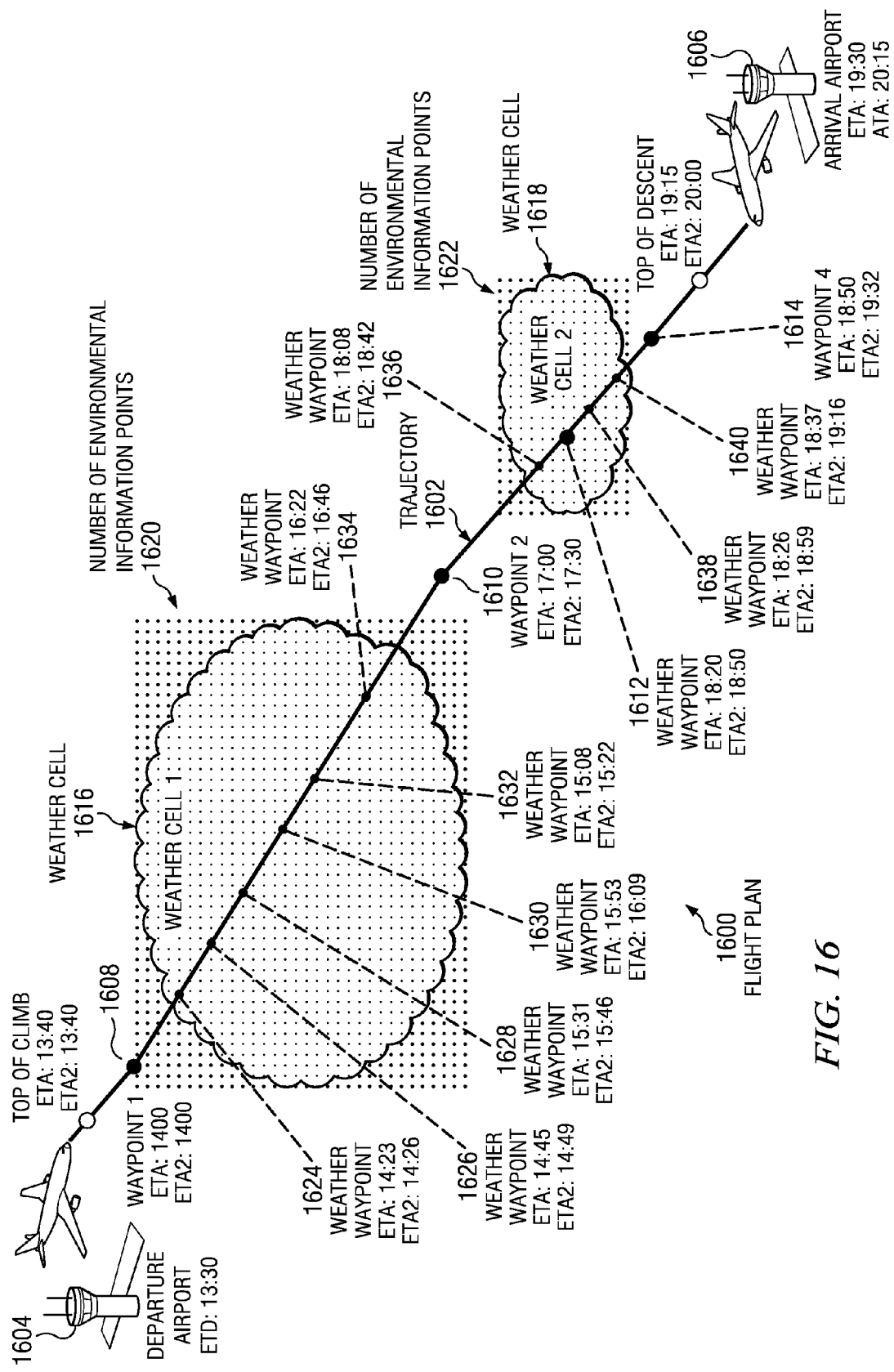
FIG. 16 is an illustration of a flight plan in accordance with an advantageous embodiment.

With reference now to FIG. 16, an illustration of a flight plan is depicted in accordance with an advantageous embodiment. Flight plan 1600 may be an illustrative example of one implementation of flight plan 1500 in FIG. 15 after a system has included a number of suggested weather waypoints.

Flight plan 1600 includes trajectory 1602. Trajectory 1602 defines the path of travel for an aircraft between departure airport 1604 and arrival airport 1606 using flight plan 1600. Trajectory 1602 includes waypoint 1608, waypoint 1610, waypoint 1612, and waypoint 1614. Waypoints 1608, 1610, 1612, and 1614 are existing waypoints of trajectory 1602 for flight plan 1600 prior to the addition of suggested waypoints. A waypoint is a reference point in physical space used for navigation by an aircraft, such as aircraft 314 in FIG. 3 using flight plan 1600.

Weather cell 1616 and weather cell 1618 may be environmental cells along trajectory 1602 that affect a number of factors for an aircraft using flight plan 1600. In order for an aircraft using flight plan 1600 to become aware of these environmental cells that may affect travel, a system is used to determine environmental information for areas along trajectory 1602 and use the information to suggest additional waypoints for insertion into flight plan 1600. The system may be, for example, environmental waypoint insertion system 400 in FIG. 4.

The system may identify number of environmental information points 1620 associated with the segment of flight plan 1600 between waypoint 1608 and waypoint 1610. Number of environmental information points 1620 is an illustrative example of one implementation of environmental information points 332 in FIG. 3. Number of environmental information points 1620 represent a grid, or resolution, available from a given weather source providing number of environmental information points 1620. The system may also identify number of environmental information points 1622 for the segment of flight plan 1600 surrounding waypoint 1612.

The system identifies the environmental information points along trajectory 1602 from number of environmental information points 1620 and number of environmental information points 1622, as illustrated in FIG. 15. The system associates the environmental points identified with trajectory 1602 using a trajectory method, such as trajectory method 432 in FIG. 4. The system then processes the identified environmental points using assessment processor 403 in FIG. 4 to determine which of the identified environmental points are significant based on customer configurations. The system uses the identified significant environmental points to suggest waypoints for insertion into flight plan 1600. Weather waypoint 1624, weather waypoint 1626, weather waypoint 1628, weather waypoint 1630, weather waypoint 1632, and weather waypoint 1634 are suggested waypoint insertions for the segment between waypoint 1608 and waypoint 1610, where weather cell 1616 is detected.

Weather waypoint 1636, weather waypoint 1638, and weather waypoint 1640 are suggested waypoint insertions for the segment of flight plan 1600 adjacent to waypoint 1612, where weather cell 1618 is detected.

Figure 17:
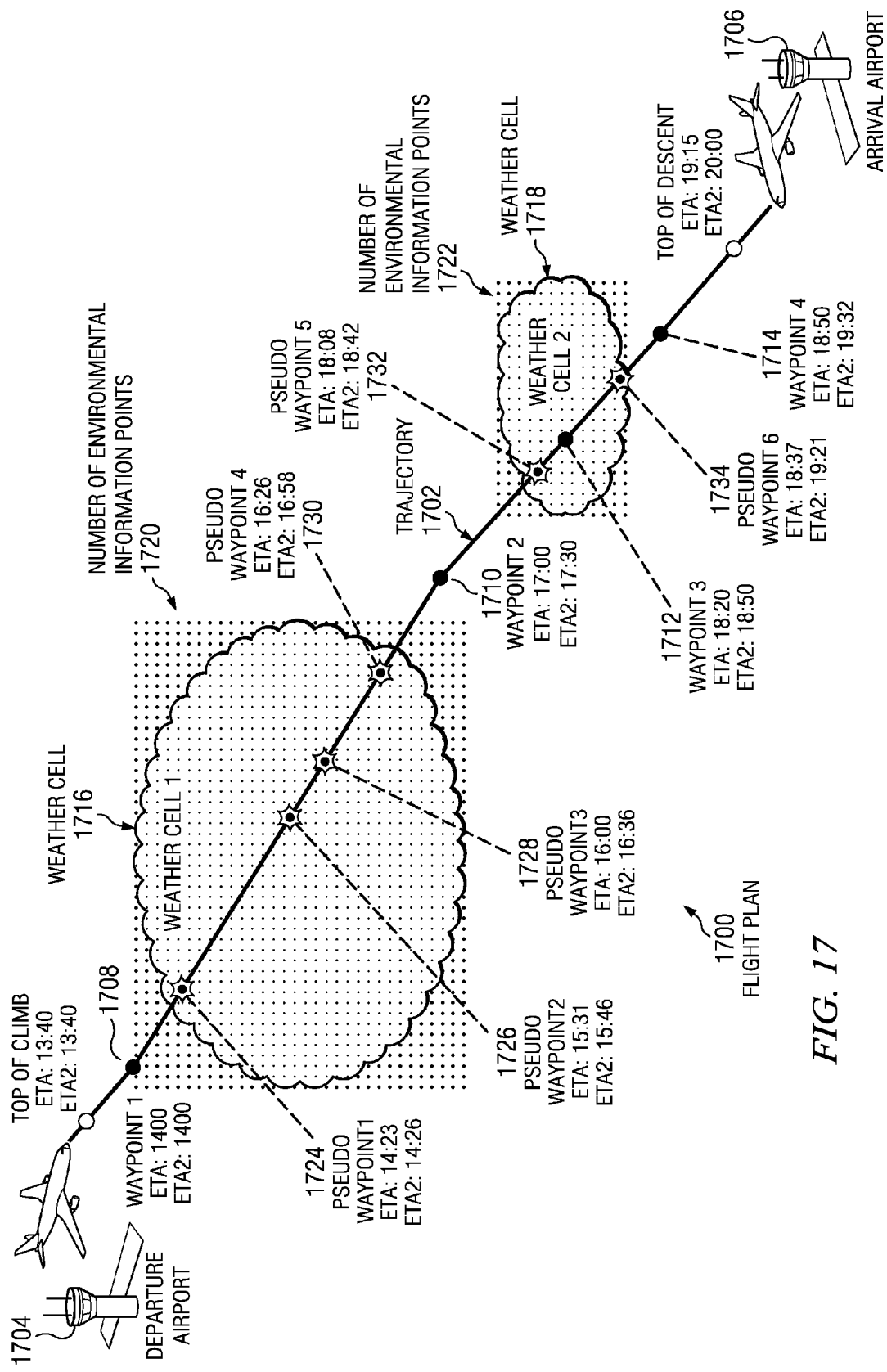
FIG. 17 is an illustration of a flight plan in accordance with an advantageous embodiment.

With reference now to FIG. 17, an illustration of a flight plan is depicted in accordance with an advantageous embodiment. Flight plan 1700 may be an illustrative example of one implementation of flight plan 1500 in FIG. 15 after a system has partitioned a trajectory using trajectory method 432 in FIG. 4.

Flight plan 1700 includes trajectory 1702. Trajectory 1702 defines the path of travel for an aircraft between departure airport 1704 and arrival airport 1706 using flight plan 1700. Trajectory 1702 includes waypoint 1708, waypoint 1710, waypoint 1712, and waypoint 1714. Waypoints 1708, 1710, 1712, and 1714 are existing waypoints of trajectory 1702 for flight plan 1700 prior to the addition of pseudo waypoints. A waypoint is a reference point in physical space used for navigation by an aircraft, such as aircraft 314 in FIG. 3 using flight plan 1700.

Weather cell 1716 and weather cell 1718 may be environmental cells along trajectory 1702 that affect a number of factors for an aircraft using flight plan 1700. In order for an aircraft using flight plan 1700 to become aware of these environmental cells that may affect travel, a system is used to determine environmental information for areas along trajectory 1702 and use the information to suggest additional waypoints for insertion into flight plan 1700. The system may be, for example, environmental waypoint insertion system 400 in FIG. 4.

The system may partition the segment of flight plan 1700 between waypoint 1708 and waypoint 1710 based on a customer configuration, such as configuration information 440 in FIG. 4, for example. The system adds pseudo waypoint 1724, pseudo waypoint 1726, pseudo waypoint 1728, and pseudo waypoint 1730 to the segment of flight plan 1700 between waypoint 1708 and waypoint 1710. The system then identifies environmental information for each of the pseudo waypoints using number of environmental information points 1720 retrieved from a weather source, such as number of environmental sources 800 in FIG. 8. Number of environmental information points 1720 represent a grid, or resolution, available from a given weather source providing number of environmental information points 1720. The system may also identify number of environmental information points 1722 for the segment of flight plan 1700 surrounding waypoint 1712, and use number of environmental information points 1722 to identify environmental information for pseudo waypoints 1732 and 1734.

Figure 18:
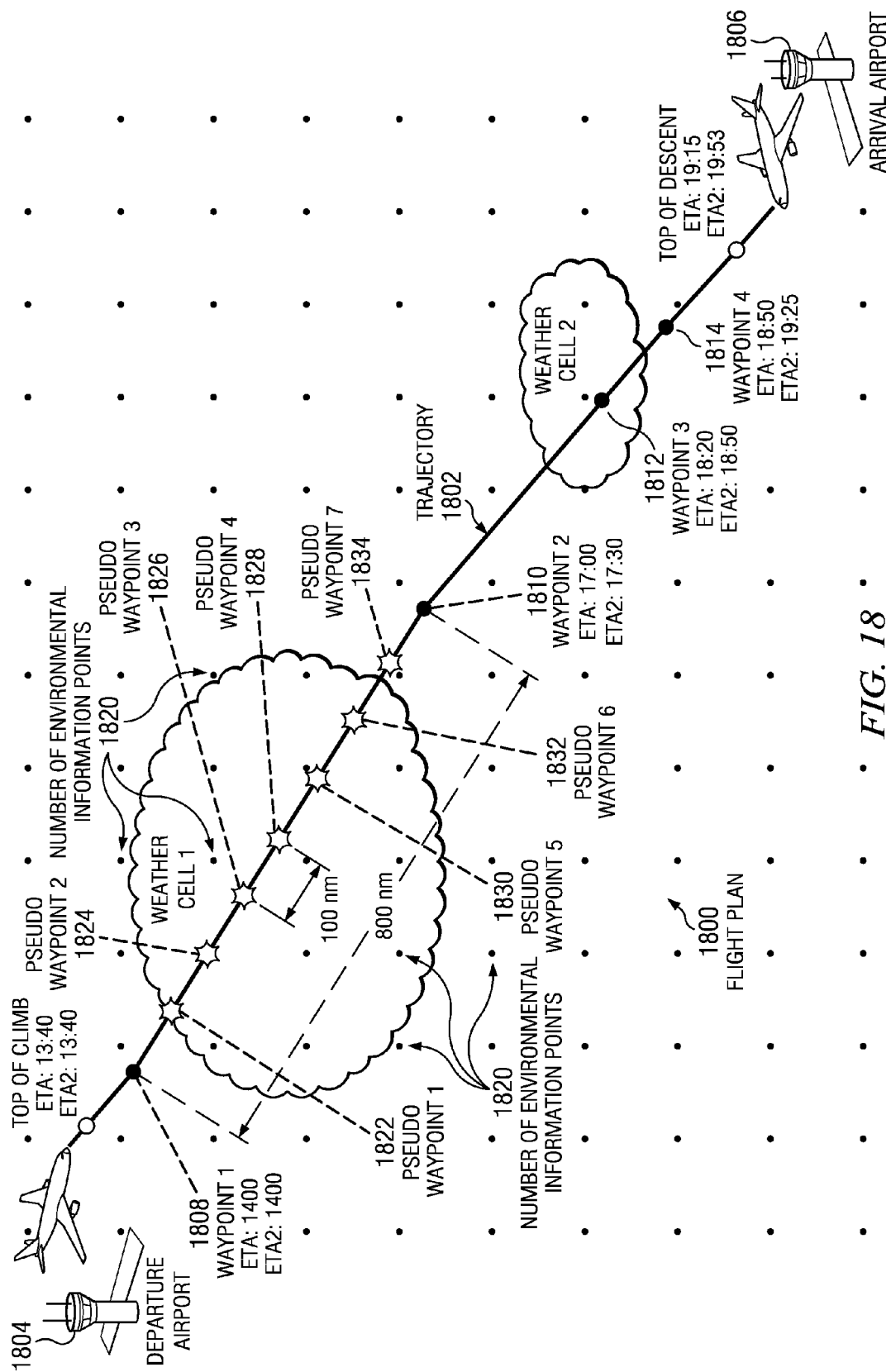
FIG. 18 is an illustration of a flight plan in accordance with an advantageous embodiment.

With reference now to FIG. 18, an illustration of a flight plan is depicted in accordance with an advantageous embodiment. Flight plan 1800 is an illustrative example of a flight plan, such as flight plan 500 in FIG. 5 and/or flight plan 1500 in FIG. 15, where the resolution of the environmental source is of a lower fidelity or less dense grid.

Flight plan 1800 includes trajectory 1802. Trajectory 1802 defines the path of travel for an aircraft between departure airport 1804 and arrival airport 1806 using flight plan 1800. Trajectory 1802 includes waypoint 1808, waypoint 1810, waypoint 1812, and waypoint 1814. Waypoints 1808, 1810, 1812, and 1814 are existing waypoints of trajectory 1802 for flight plan 1800 prior to the addition of pseudo waypoints. A waypoint is a reference point in physical space used for navigation by an aircraft, such as aircraft 314 in FIG. 3 using flight plan 1800.

A system, such as environmental waypoint insertion system 400 in FIG. 4, may partition the segment of flight plan 1800 between waypoint 1808 and waypoint 1810 based on a customer configuration, such as configuration information 440 in FIG. 4, for example. In this illustrative example, the customer configuration may dictate that when the resolution of number of environmental information points 1820 is outside a desired resolution, a partition method is to be used to obtain a finer degree of environmental information, for example.

The system adds pseudo waypoint 1822, pseudo waypoint 1824, pseudo waypoint 1826, pseudo waypoint 1828, pseudo waypoint 1830, pseudo waypoint 1832, and pseudo waypoint 1834 to the segment of flight plan 1800 between waypoint 1808 and waypoint 1810. The system then identifies environmental information for each of the pseudo waypoints using number of environmental information points 1820 retrieved from a weather source, such as number of environmental sources 800 in FIG. 8. Number of environmental information points 1820 represent a grid, or resolution, available from a given weather source providing number of environmental information points 1820.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The different advantageous embodiments recognize and take into account a number of different considerations. For example, the different advantageous embodiments recognize and take into account that currently used systems do not have the ability to suggest flight plan waypoint insertions based on environmental points. Even when environmental information is transmitted, current methods increase inefficiencies in the flight trajectory calculations if the environmental information is out of date, not entered into a flight management computer, or provided at the wrong time. Additionally, current systems and methods for transmitting environmental information do not consider the impact of environmental factors, flight phases, the type of environmental information, or aircraft events on the required procedures from air traffic management. Required procedures may include speed constraints, route adjustments, or other flight modifications in response to a significant environmental cell. The unpredictability of existing solutions can lead to poor scheduling solutions and less efficient flights.

The different advantageous embodiments further recognize and take into account the need for a system that can identify environmental cells affecting a flight trajectory and automatically suggest waypoint insertions to maintain accuracy of time predictability, fuel consumption, and aircraft performance.

Thus, the different advantageous embodiments provide methods and systems to determine significant environmental information points along a trajectory and advises waypoint insertion suggestions for accurately determining estimated times of arrival and improving flight efficiency. These different methods for determining a solution, each with their own advantages, may be selected and used based on a number of variables including segment length along a flight trajectory, weather resolution, processing limitations, customer requirements, and the fidelity of environmental information available.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of generating flight trajectory environmental information points, the method comprising:
   receiving, by a processor unit, an environmental information point from an environmental source, wherein the environmental information point identifies a location of the environmental information point and environmental information for the location;
   determining, by the processor unit, whether the location of the environmental information point is along a flight trajectory;
   determining, by the processor unit, whether the environmental information identified for the environmental information point is significant; and
   inserting, by the processor unit, a waypoint corresponding to the environmental information point into a flight plan in response to a determination that the location of the environmental information point is along the fight trajectory and that the environmental information identified for the environmental information point is significant.

2. The method of claim 1 further comprising:
   running a trajectory method, wherein the trajectory method generates a number of pseudo waypoints for the flight plan; and
   wherein inserting the waypoint corresponding to the environmental information point into the flight plan comprises associating the environmental information point with a one of the number of pseudo waypoints generated.

3. The method of claim 1, wherein the environmental information identifies environmental conditions at the location selected from the group of environmental conditions consisting of weather, temperature, pressure, humidity, turbulence, wind speed, and wind direction.

4. The method of claim 1, wherein determining whether the environmental information identified for the environmental information point is significant comprises determining whether the environmental information identifies an environmental condition that influences the flight prediction cost, time, fuel, or performance causing errors in flight predictions for an aircraft following the flight plan to exceed a threshold value for a configured acceptance.

5. The method of claim 1, wherein inserting the waypoint corresponding to the environmental information point into the flight plan comprises associating the environmental information point with a pseudo waypoint inserted into the flight plan.

6. The method of claim 1 further comprising:
   partitioning a portion of a one of the flight trajectory and the flight plan into a plurality of segments, wherein an end of a segment in the plurality of segments comprises a pseudo waypoint, wherein the pseudo waypoint does not correspond to a waypoint that is already in the flight plan;
   and wherein inserting the waypoint corresponding to the environmental information point into the flight plan comprises associating the environmental information point with the pseudo waypoint.

7. The method of claim 6, wherein partitioning the portion of the one of the flight trajectory and the flight plan into the plurality of segments comprises partitioning the portion of the one of the flight trajectory and the flight plan into the plurality of segments of approximately equal length.

8. The method of claim 6, wherein determining whether the location of the environmental information point is along the flight trajectory comprises identifying from a plurality of environmental information points whether the location of the environmental information point is closest to the pseudo waypoint.

9. An apparatus configured to generate a flight plan for a flight trajectory, the apparatus comprising a processor unit configured to:
receive an environmental information point from an environmental source, wherein the environmental information point identifies a location of the environmental information point and environmental information for the location;
determine whether the location of the environmental information point is along the flight trajectory;
determine whether the environmental information identified for the environmental information point is significant; and
insert a waypoint corresponding to the environmental information point into the flight plan in response to a determination that the location of the environmental information point is along the fight trajectory and that the environmental information identified for the environmental information point is significant.

10. The apparatus of claim 9 further comprising a waypoint insertion manager configured to:
run a trajectory method wherein the trajectory method generates a number of pseudo waypoints for the flight plan; and
associate the environmental information point with a one of the number of pseudo waypoints generated to insert the waypoint corresponding to the environmental information point into the flight plan.

11. The apparatus of claim 9,
wherein the environmental information identifies environmental conditions at the location selected from the group of environmental conditions consisting of weather, temperature, pressure, humidity, turbulence, wind speed, and wind direction.

12. The apparatus of claim 9, further comprising an assessment processor configured to determine whether the environmental information identified for the environmental information point is significant by determining whether the environmental information identifies an environmental condition that influences the flight prediction cost, time, fuel or performance causing errors in flight predictions for an aircraft following the flight plan to exceed a threshold value for a configured acceptance.

13. The apparatus of claim 9, further comprising a waypoint insertion manager configured to associate the environmental information point with a pseudo waypoint inserted into the flight plan to insert the waypoint corresponding to the environmental information point into the flight plan.

14. The apparatus of claim 9 further comprising:
a waypoint insertion manager configured to partition a portion of a one of the flight trajectory and the flight plan into a plurality of segments, wherein an end of a segment in the plurality of segments comprises a pseudo waypoint, wherein the pseudo waypoint does not correspond to a waypoint that is already in the flight plan, and insert the waypoint corresponding to the environmental information point into the flight plan by associating the environmental information point with the pseudo waypoint.

15. The apparatus of claim 14, wherein the waypoint insertion manager is configured to partition the portion of the one of the flight trajectory and the flight plan into the plurality of segments of approximately equal length.

16. The apparatus of claim 14, wherein the waypoint insertion manager is configured to determine whether the location of the environmental information point is along the flight trajectory by determining from a plurality of environmental information points whether the location of the environmental information point is closest to the pseudo waypoint.

* * * * *